United States Patent
Curry

(10) Patent No.: US 6,798,541 B2
(45) Date of Patent: Sep. 28, 2004

(54) SYSTEMS AND METHODS FOR GENERATING BINARY CLUSTERED, IRRATIONAL HALFTONE DOTS

(75) Inventor: Douglas N. Curry, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 658 days.

(21) Appl. No.: 09/681,967

(22) Filed: Jun. 29, 2001

(65) Prior Publication Data

US 2003/0007187 A1 Jan. 9, 2003

(51) Int. Cl.[7] ................................................. H04N 1/40
(52) U.S. Cl. ..................... 358/2.99; 358/1.9; 358/3.01; 358/3.07; 382/299
(58) Field of Search .................... 358/1.9, 2.1, 2.99, 358/3.01, 3.02, 3.05–3.07, 3.09, 3.1, 3.13–3.19, 3.23, 3.24, 3.26, 533–536; 382/237, 270

(56) References Cited

U.S. PATENT DOCUMENTS

| | | | |
|---|---|---|---|
| 4,537,470 A | | 8/1985 | Schoppmeyer |
| 5,410,414 A | | 4/1995 | Curry |
| 5,732,162 A | * | 3/1998 | Curry .......................... 382/294 |
| 5,884,013 A | * | 3/1999 | Bosschaerts et al. ......... 358/1.9 |
| 6,222,950 B1 | * | 4/2001 | Sugiura et al. ............... 358/1.9 |
| 6,233,060 B1 | * | 5/2001 | Shu et al. ..................... 358/1.9 |

FOREIGN PATENT DOCUMENTS

EP          0 454 274 A2  *  4/1991     ............ H04N/1/40

* cited by examiner

*Primary Examiner*—Thomas D. Lee
*Assistant Examiner*—James Thompson
(74) *Attorney, Agent, or Firm*—Oliff & Berridge, PLC

(57) ABSTRACT

The result of integrating a halftone dot-shape can be clustered. When the edge of the halftone dot-shape extends across a "vertical" edge of a window, the window is altered until the edge of the halftone dot-shape no longer crosses either vertical edge of the altered window. The image density of the portion of the halftone dot-shape contained within the altered window is determined. The block of image density of the portion of the halftone dot shape contained within the altered window is aligned with the right edge, the left edge, split between the left and right edges, or clustered in the "center" of the altered window. An amount of the determined block that extends into the original sample window is determined. This amount extending into the original window determines the amount of image density to be generated in the final output image based on that sample location of the window.

26 Claims, 24 Drawing Sheets

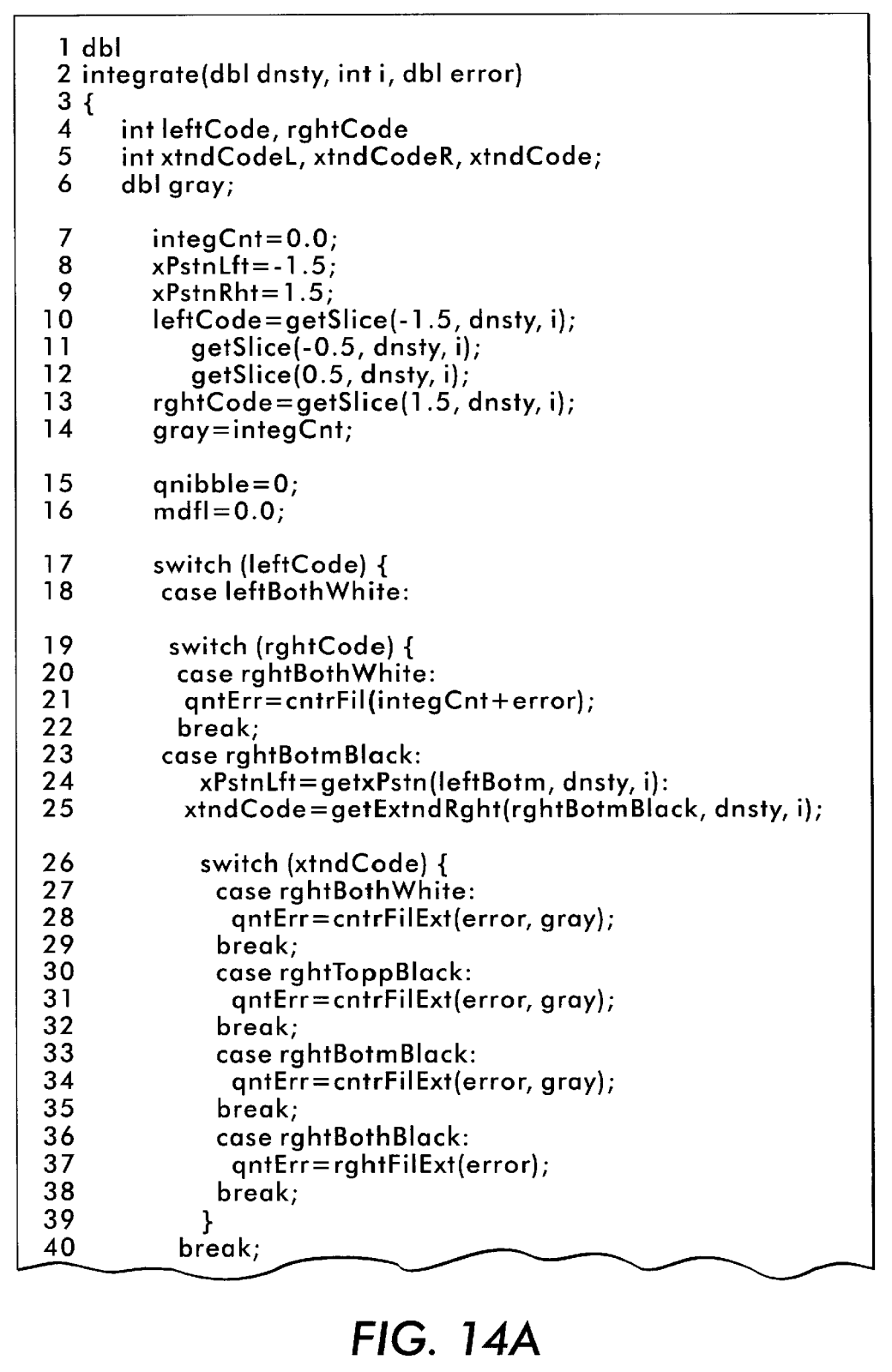

```
1  dbl
2  integrate(dbl dnsty, int i, dbl error)
3  {
4      int leftCode, rghtCode
5      int xtndCodeL, xtndCodeR, xtndCode;
6      dbl gray;

7        integCnt=0.0;
8        xPstnLft=-1.5;
9        xPstnRht=1.5;
10       leftCode=getSlice(-1.5, dnsty, i);
11          getSlice(-0.5, dnsty, i);
12          getSlice(0.5, dnsty, i);
13       rghtCode=getSlice(1.5, dnsty, i);
14       gray=integCnt;

15       qnibble=0;
16       mdfl=0.0;

17       switch (leftCode) {
18        case leftBothWhite:

19         switch (rghtCode) {
20          case rghtBothWhite:
21           qntErr=cntrFil(integCnt+error);
22           break;
23          case rghtBotmBlack:
24             xPstnLft=getxPstn(leftBotm, dnsty, i):
25             xtndCode=getExtndRght(rghtBotmBlack, dnsty, i);

26             switch (xtndCode) {
27              case rghtBothWhite:
28                qntErr=cntrFilExt(error, gray);
29              break;
30              case rghtToppBlack:
31                qntErr=cntrFilExt(error, gray);
32              break;
33              case rghtBotmBlack:
34                qntErr=cntrFilExt(error, gray);
35              break;
36              case rghtBothBlack:
37                qntErr=rghtFilExt(error);
38              break;
39             }
40          break;
```

*FIG. 14A*

```
41      case rghtToppBlack:
42        xPstnLft=getxPstn(leftTopp, dnsty, i):
43        xtndCode=getExtndRght(rghtToppBlack, dnsty, i);
44        switch (xtndCode) {
45          case rghtBothWhite:
46            qntErr=cntrFilExt(error, gray);
47            break;
48          case rghtToppBlack:
49            qntErr=cntrFilExt(error, gray);
50            break;
51          case rghtBotmBlack:
52            qntErr=cntrFilExt(error, gray);
53            break;
54          case rghtBothBlack:
55            qntErr=rghtFilExt(error);
56            break;
57        }
58      break;

59      case rghtBothBlack:
60        qntErr=rghtFil(integCnt+error);
61      break;
62    }
63    break;

64    case leftBotmBlack:
65      switch (rghtCode) {
66        case rghtBothWhite:
67          xPstnRht=getxPstn(rghtBotm, dnsty, i);
68          xtndCode=getExtndLeft(leftBotmBlack, dnsty, i);

69          switch (xtndCode) {
70            case leftBothWhite:
71              qntErr=cntrFilExt(error, gray);
72              break;
73            case leftToppBlack:
74              qntErr=leftFilExt(error);
75              break;
76            case leftBotmBlack:
77              qntErr=leftFilExt(error);
78              break;
79            case leftBothBlack:
80              qntErr=leftFilExt(error);
81              break;
82          }
83        break;
```

*FIG. 14B*

```
84        case rghtToppBlack:
85        case rghtBotmBlack:
86           xtndCodeL=getExtndLeft(leftBotmBlack, dnsty, i);
87           xtndCodeR=getExtndRght(rghtBotmBlack, dnsty, i);

88           switch (xtndCodeL) {
89            case leftBothWhite:

90             switch (xtndCodeR) {
91              case rghtBothWhite:
92                qntErr=cntrFilExt(error, gray);
93                break;
94              case rghtToppBlack:
95                qntErr=cntrFilExt(error, gray);
96                break;
97              case rghtBotmBlack:
98                qntErr=cntrFilExt(error, gray);
99                break;
100             case rghtBothBlack:
101               qntErr=rghtFilExt(error);
102               break;
103            }
104            break;

105           case leftToppBlack:
106           case leftBotmBlack:

107            switch (xtndCodeR) {
108             case rghtBothWhite:
109               qntErr=cntrFilExt(error, gray);
110               break;
111             case rghtToppBlack:
112               qntErr=cntrFilExt(error, gray);
113               break;
114             case rghtBotmBlack:
115               qntErr=cntrFilExt(error, gray);
116               break;
117             case rghtBothBlack:
118               qntErr=spltFilExt(error);
119               break;
120           }
121           break;
```

FIG. 14C

```
122        case leftBothBlack:
123         switch (xtndCodeR) {
124          case rghtBothWhite:
125             qntErr=leftFilExt(error);
126          break;
127          case rghtToppBlack:
128             qntErr=spltFilExt(error);
129          break;
130          case rghtBotmBlack:
131             qntErr=spltFilExt(error);
132          break;
133          case rghtBothBlack:
134             qntErr=spltFilExt(error);
135          break;
136         }
137        break;
138      }
139     break;

140     case rghtBothBlack:
141        xPstnRht=getxPstn(leftTopp, dnsty, i);
142        xtndCode=getExtndLeft(leftBotmBlack, dnsty, i);

143        switch (xtndCode) {
144         case leftBothWhite:
145          qntErr=rghtFilExt(error);
146         break;
147         case leftToppBlack:
148          qntErr=rghtFilExt(error);
149         break;
150         case leftBotmBlack:
151          qntErr=rghtFilExt(error);
152         break;
153         case leftBothBlack:
154          qntErr=spltFilExt(error);
155         break;
156        }
157       break;
158      }
159     break;
```

FIG. 14D

```
160        case leftToppBlack:
161         switch (rghtCode) {
162          case rghtBothWhite:
163           xPstnRht=getxPstn(rghtTopp, dnsty, i);
164           xtndCode=getExtndLeft(leftToppBlack, dnsty, i);
165           switch (xtndCode) {
166            case leftBothWhite:
167             qntErr=cntrFilExt(error, gray);
168             break;
169            case leftToppBlack:
170             qntErr=leftFilExt(error);
171             break;
172            case leftBotmBlack:
173             qntErr=leftFilExt(error);
174             break;
175            case leftBothBlack:
176             qntErr=leftFilExt(error);
177             break;
178           }
179           break;
180          case rghtBotmBlack:
181          case rghtToppBlack:
182            xtndCodeL=getExtndLeft(leftToppBlack, dnsty, i);
183            xtndCodeR=getExtndRght(rghtToppBlack, dnsty, i);
184            switch (xtndCodeL) {
185            case leftBothWhite:
186             switch (xtndCodeR) {
187              case rghtBothWhite:
188               qntErr=cntrFilExt(error, gray);
189               break;
190              case rghtToppBlack:
191               qntErr=cntrFilExt(error, gray);
192               break;
193              case rghtBotmBlack:
194               qntErr=cntrFilExt(error, gray);
195               break;
196              case rghtBothBlack:
197               qntErr=rghtFilExt(error);
198               break;
199             }
200             break;
```

*FIG. 14E*

```
201         case leftToppBlack:
202         case leftBotmBlack:
203          switch (xtndCodeR) {
204           case rghtBothWhite:
205            qntErr=cntrFilExt(error, gray);
206            break;
207           case rghtToppBlack:
208            qntErr=cntrFilExt(error, gray);
209            break;
210           case rghtBotmBlack:
211            qntErr=cntrFilExt(error, gray);
212            break;
213           case rghtBothBlack:
214            qntErr=spltFilExt(error);
215            break;
216          }
217          break;

218         case leftBothBlack:

219          switch (xtndCodeR) {
220           case rghtBothWhite:
221            qntErr=leftFilExt(error);
222            break;
223           case rghtToppBlack:
224            qntErr=spltFilExt(error);
225            break;
226           case rghtBotmBlack:
227            qntErr=spltFilExt(error);
228            break;
229           case rghtBothBlack:
230            qntErr=spltFilExt(error);
231            break;
232          }
233           break;
234         }
235        break;

236        case rghtBothBlack:
237         xPstnRht=getxPstn(leftBotm, dnsty, i);
238         xtndCode=getExtndLeft(leftToppBlack, dnsty, i);
```

*FIG. 14F*

```
239            switch (xtndCode) {
240             case leftBothWhite:
241              qntErr=rghtFilExt(error);
242             break;
243             case leftToppBlack:
244              qntErr=rghtFilExt(error);
245             break;
246             case leftBotmBlack:
247              qntErr=rghtFilExt(error);
248             break;
249             case leftBothBlack:
250              qntErr=spltFilExt(error);
251             break;
252            }
253          break;
254         }
255        break;

256       case leftBothBlack:

257        switch (rghtCode) {
258         case rghtBothWhite:
259          qntErr=leftFil(integCnt+error);
260         break;
261         case rghtBotmBlack:
262            xPstnLft=getxPstn(rghtTopp, dnsty, i);
263            xtndCode=getExtndRght(rghtBotmBlack, dnsty, i);

264            switch (xtndCode) {
265             case rgthBothWhite:
266              qntErr=leftFilExt(error);
267             break;
268             case rghtToppBlack:
269              qntErr=spltFilExt(error);
270             break;
271             case rghtBotmBlack:
272              qntErr=spltFilExt(error);
273             break;
274             case rghtBothBlack:
275              qntErr=spltFilExt(error);
276             break;
277            }
278          break;
```

*FIG. 14G*

```
279        case rghtToppBlack:
280           xPstnLft=getxPstn(rghtBotm, dnsty, i);
281           xtndCode=getExtndRght(rghtToppBlack, dnsty, i);
282           switch (xtndCode) {
283            case rgthBothWhite:
284              qntErr=leftFilExt(error);
285            break;
286            case rghtToppBlack:
287              qntErr=spltFilExt(error);
288            break;
289            case rghtBotmBlack:
290              qntErr=spltFilExt(error);
291            break;
292            case rghtBothBlack:
293              qntErr=spltFilExt(error);
294            break;
295           }
296          break;
297         case rgthBothBlack:
298           qntErr=spltFil(integCnt+error);
299         break;
300        }//rghtCode
301       break;
302      }
303      return qntErr;
304 }
```

FIG. 14H

SYSTEMS AND METHODS FOR GENERATING BINARY CLUSTERED, IRRATIONAL HALFTONE DOTS

BACKGROUND OF INVENTION

1. Field of Invention

This invention relates to systems and methods for generating binary irrational halftone dots based on a spatially modulated stimulus.

2. Description of Related Art

When creating image regions using halftoning, binary clustered halftone dots are desirable. In particular, binary clustered halftone dots often produce the least amount of noise and the best highlights. Conventional halftoning adds a two-dimensional, spatially periodic, dot screen or line screen structure to the images to be halftoned. Typically, the same screen, or at least a number of essentially identical screens, are used to halftone each of the color image separation layers of a polychromatic, i.e., color, image. However, the halftone screens are oriented at different angles for printing the respective halftone color image separation layers.

Digital halftoning has evolved as a method of rendering the illusion of continuous tone, or "contone", images using devices that are capable of producing only binary picture elements. However, digital halftoning can suffer from misregistration between the various color image separation layers used in color image, for example, cyan, magenta, yellow and black (CMYK) color image separation layers. This misregistration can be caused by misalignment among the various halftone screens and also by misalignment between the halftone screens and an image forming apparatus grid structure, i.e., an output grid structure, used to generate electronic image data from an image, on an image forming member. This misregistration can also include errors in rotation of the screen angle. This misregistration can cause moiré patterns.

Moiré patterns can also be generated based on the screen angles used for each of the color separation layers, even without any misregistration. Regardless of how the moiré patterns are formed, moiré patterns are detrimental to the accurate rendering of the color image. Moiré patterns arise due to "beating", i.e., periodically mismatching patterns of interference that degrade the resulting rendered images. When the various color separation layers are combined during rendering of a multicolor image, where each color separation layer uses a different halftone screen or the same screen at a different angle, a moiré pattern can result. The resulting moiré pattern can cause a color shift or variation in tone.

Substantial effort and expense have been invested in minimizing the moiré patterns caused by halftoning techniques for producing binary renderings of contone images. Misregistration, improper screen angle, and improper screen frequency can increase the halftone screens' susceptibility to moiré patterns. Additionally, because the moiré patterns can be caused by halftone screens beating with the output grid structure, the moiré pattern may be caused by a difference between the halftone screen, pitch frequencies and the re-sampling rate frequency within the image forming apparatus. Even minor variations in the dot position caused by systematic errors, such as quantization round off errors, can produce moiré patterns resulting from beat frequencies between the periodic screens.

In general, increasing the angle differences between the halftone screens reduces the prominence of moiré patterns because the interference between the image separation layers is more frequent but the amplitude of the interference is lessened. In addition to errors in frequency or in angle, the grid structure of the stimulus applied by the image output apparatus used to create the color separation layers can also contain imperfections. If the respective grid structures for all of the color separation layers do not exactly align, the halftones can be misregistered, becoming another source of moiré patterns.

Thus, the perceived quality of the resulting color image is strongly dependent on the precision with which the color image separations are spatially registered with each other, as well as the precision with which the halftone screens are oriented in relationship to each other and/or to the output grid used by the image forming apparatus. Conventional halftoning methods, such as those disclosed in U.S. Pat. No. 5,410,414 to Curry, incorporated herein by reference in its entirety, and U.S. Pat. No. 4,537,470 to Schoppmeyer, warp, i.e., adjust or move, the image data produced by an image data generator to improve registration. Such image data generators include gray scale image generators and binary image generators. However, merely warping the image data to improve registration results in offsets with the image data which have no corresponding adjustment or warp in the halftone screens used to render the color image separation layers.

Therefore, minimizing the moiré patterns conventionally includes also warping one or more of the halftone screens in a halftone screen system to correspond to the warping of the image data. This is disclosed in greater detail in U.S. Pat. No. 5,732,162 to Curry, incorporated herein by reference in its entirety. The 162 patent provides a detailed discussion of warping both image data and halftone screens.

High addressability or hyperacuity refers to the ability to locate an edge, occurring between one portion of an image and another portion of an image, at a resolution that is greater than the resolution of the stimulus used to form the image. Such edges often occur between halftone dots and the non-image background regions of each of the color separation layers.

One common stimulus used by various image forming apparatus to form images is a light beam scanned by a raster output scanner (ROS). A raster output scanner scans one or more such light beams across a photoreceptor drum or belt. In general, the raster output scanner scans each of the light beams across the photoreceptor drum or belt in a fast scan direction while the photoreceptor drum or belt simultaneously moves relative to the scanned light beam in a slow scan direction. As the one or more light beams are scanned across the photoreceptor drum or belt in the fast scan direction, the one or more light beams are individually modulated between off and on at a high rate. In particular, in various known high addressability systems, each light beam is modulated at a rate that is four times the period it takes the raster output scanner to move the one or more light beams a distance along the fast scan direction that is equal to the diameter of the light beams. This is known as 4× high addressability. As shown in FIGS. 1 and 2, 4× high addressability allows the location at which the one or more light beams are turned on to be spatially controlled to one-quarter of the diameter of the light beam along the fast scan direction.

However, as also shown in FIGS. 1 and 2, the center-to-center spacing of two adjacent light beams or of two adjacent scans of a single light beam are offset by the diameter of the one or more light beams. Therefore, as shown in FIG. 3, when the edges of an image structure, such as a halftone dot, extend across the laser beam in directions that are not substantially aligned across the fast scan direction, the light beam cannot merely be turned on when the current scan of the light beam intersects with the image structure, such as a halftone dot, and left on until the light beam no longer intersects the image structure. Doing so would result in significantly more toner being applied to the resulting developed image at that area. This would itself result in that portion of the image having an image density that significantly departs from the desired image density represented by the image structure, such as the halftone dot. Conventionally, as shown in FIG. 16, to avoid this change in image density, the edge of the image structure, such as the halftone dot, that extends along the fast scan direction, and therefore, across the slow scan direction, is "dithered", i.e., modulated, at a very high rates, so that the actual amount of image density of the developed image more closely corresponds to the image density of the overall image structure, such as the halftone dot.

SUMMARY OF INVENTION

It should be appreciated that, in the preceding discussion, and throughout this disclosure, the discussed exemplary embodiments use a flying spot raster output scanner. In such raster output scanners, "horizontal" refers to the fast scan direction, while "vertical" refers to the slow scan direction. While the following discussion will generally use the terms horizontal and vertical to refer to the fast and slow scan directions, it should be appreciated that there are other types of exposure systems and imagers, such as LED light bar printers or ink jet printers, that switch the directions so that it may be more convenient in such systems to refer to the fast scan direction as the "vertical" direction and the slow scan direction as the "horizontal" direction. For ease of understanding, the following discussing will use the terms "horizontal" and "vertical" relative to the fast and slow scan directions. However, those of ordinary skill in the art will readily be able to determine those systems where the horizontal, rather than the vertical, edges will be aligned with the slow scan direction.

Electronic registration refers to adjusting the spatial positions on the image substrate that the image structures, such as the halftone dots, will be placed by the image forming apparatus to compensate for any physical offsets in the image forming apparatus that would otherwise result in misregistration between the color separation layers. That is, rather than physically, i.e., mechanically, ensuring that the color separation layers are precisely aligned, the various offsets between the various color separation layers are measured. The electronic data is then electronically adjusted to change the spatial locations of the resulting image structures, so that the resulting image structures of each corresponding color separation layer are properly aligned. Being able to move or warp an image structure such as halftone dots without causing moir é patterns or noise that detract from the image quality will increase the utility of electronic registration.

Dithering the edges of an image structure, such as a halftone dot, that extend horizontally along the fast scan direction can accurately capture the correct image density to be represented by the image structure, such as the halftone dot. However, such high-frequency structures along the edges of the image structure, such as the halftone dot, often, if not invariably, result in artifacts, such as moir é patterns or noise, when the halftone dots are moved to accomplish electronic registration. In particular, dithering the edges of the image structures, such as the halftone dots, to ensure the proper tone is reproduced generally renders it impossible to avoid such moir é patterns and/or noise in the resulting image when electronic registration is used.

In general, in high resolution image forming apparatus, the halftone dots are formed using a dot-shaped function varies the shape of the halftone dot based on the intensity level to be reproduced. Once the dot-shaped for a particular intensity level is determined using the dot-shaped function, a sample window is used to traverse the resulting dot-shape, as shown in FIGS. 1–3, to determined the modulation of the one or more light beams necessary to reproduce that dot-shape on the photoreceptor drum or belt. It should be appreciated that the dot-shape function can vary. However, one common dot-shape function is a cosine function. For cosine dots, a small eccentricity may be included to spread the midtone dot gain.

The need to create dots at specified angles or the need to warp dots in response to electronic registration requirements results in screen angles that are irrational. An irrational angle occurs when the tangent of the angle cannot be described as a quotient of two small integers. Dithering the edges of such irrational halftone dots, as outlined above, tends to result in significant moir é patterns appearing in the resulting image.

This invention provides systems and methods that permit halftone dots to be warped with reduced moir é patterns.

This invention separately provides systems and methods for warping halftone dots printed at irrational screen angles.

This invention separately provides systems and methods that avoid using dithering when generating image structures having edges that are not substantially perpendicular to a high addressability direction of the grid structure of the stimulus of the image forming apparatus.

This invention separately provides systems and methods that generally gather together, i.e., cluster, portions of an edge of an image element that represent the portions of an image object around an edge of the image object that lies along a high addressability direction and across a non-high addressability direction into generally a single block that generally corresponds to the correct image density.

In various exemplary embodiments of the systems and methods according to this invention, the result of a high resolution integration of an image structure, such as a halftone dot-shape function, is clustered. For fast scan edges of an image, i.e., those vertical edges of the image that extend across a high addressability direction, this is simple. In particular, those fast scan edges tend to be easily determined, as those fast scan edges cross over the edges, i.e., the "horizontal window edges", of a high addressability sample window that extend along the high addressability, i.e., fast scan, direction. In contrast, when the edge of the image structure, such as the halftone dot-shape, extends across an edge of the high addressability sample window that does not extend along a high addressability direction, i.e., a "vertical" window edge, the sample window is incrementally altered, and in particular, is usually extended, in the horizontal direction in one or both directions along the horizontal axis until the edge of the image structure, such as the halftone dot-shape, no longer crosses either vertical window edge of the altered sample window.

The image density of the portion of the halftone dot-shape contained within the altered sample window is then determined. Depending on the image values of the four corner high addressability regions within the altered window, the determined amount of image density is "filled" from the left or right edge of the expanded window. Otherwise, depending on the state of the four corner image regions, a "center of gravity" of the region of the image structure within the altered window is identified. The center of a block representing the image density of the area of the image structure enclosed within the altered window is then aligned with the determined center of gravity.

Once the block of image density of the portion of the image structure contained within the altered window is aligned with the right edge, the left edge or the "center" of the altered window, an amount of the determined block that extends into the original sample window is determined. This amount extending into the original sample window determines the amount of image density to be generated in the final output image based on that sample location of the sample window. That amount is recorded in the sample window as a vertical image edge and stored. Any quantization error between the amount of density appearing in the original sample window and the producible amount of image density recorded for the current sample window is determined and stored for future use.

In general, when either edge of the image structure traverses the vertical edges of a sample window, it is generally impossible to determine what value to put inside the sample window without looking at the outside, surrounding context. That is, the "horizontal" image edge could be a portion of a descender, a portion of an ascender, a slowly ascending left attached mark, a slowly descending right attached mark, or the like. However, the cluster result must always contribute the right amount of addressability units to the total area of the image structure, and geometrically position that "right amount" in reference to the center of gravity of the image structure, regardless of the set of samples that happen to define the image structure. The systems and methods of this invention tends to reduce this problem, such that the cluster result does, in fact, contribute generally the desired amount of addressability units to the total area of the image structure, and positions the clustered result appropriately, regardless of the set of samples that happen to define the dot.

These and other features and advantages of this invention are described in, or are apparent from, the following description of the systems and methods according to this invention.

BRIEF DESCRIPTION OF DRAWINGS

Various exemplary embodiments of this invention will be described in detail, with reference to the following figures, wherein:

FIGS. 14A–14H are a code listing of one exemplary embodiment of a software routine or structure useable to implement one or more steps S500–1800 of FIGS. 4, 5A and 5B;

DETAILED DESCRIPTION OF EXEMPLARY EMBODIMENTS

This invention is directed to systems and methods used to modify how a spatially-distributed stimulus is modified to cluster image elements produced according to a shape function so that the shape of the image element resulting from the modified spatial modulation has edges that are clustered together.

The following detailed description of the exemplary embodiments of this invention will be presented in view of a raster output scanner (ROS) image forming apparatus. However, it should be appreciated that the systems and methods of this invention, as described herein, can be applied to an image forming apparatus that uses any type of stimulus, including any type of projected radiation of any wavelength, a spatially-modulated magnetic field and/or magnetic flux, a spatially-modulated applied electric potential, spatially-modulated applied heat energy, a spatially modulated direct application of toner, ink or other material used to create an image, or any other known or later developed technique, medium and/or material used by an image forming apparatus to form either a developed image and/or a latent image that is subsequently developed. Thus, it should be appreciated that, while the following detailed description refers primarily to a raster output scanner that scans one or more light beams across a photoreceptor drum or belt, this description is intended to be exemplary only and not limiting in any way of the systems and methods according to the invention discussed herein.

Similarly, the following detailed description will primarily refer to a halftone dot as forming the image element. However, it should be appreciated that any image element structure could be formed using the systems and methods of this invention disclosed herein. Thus, it should be appreciated that the references to a halftone dot herein are intended to be exemplary only and not limiting of the scope of this invention.

Figure 1:
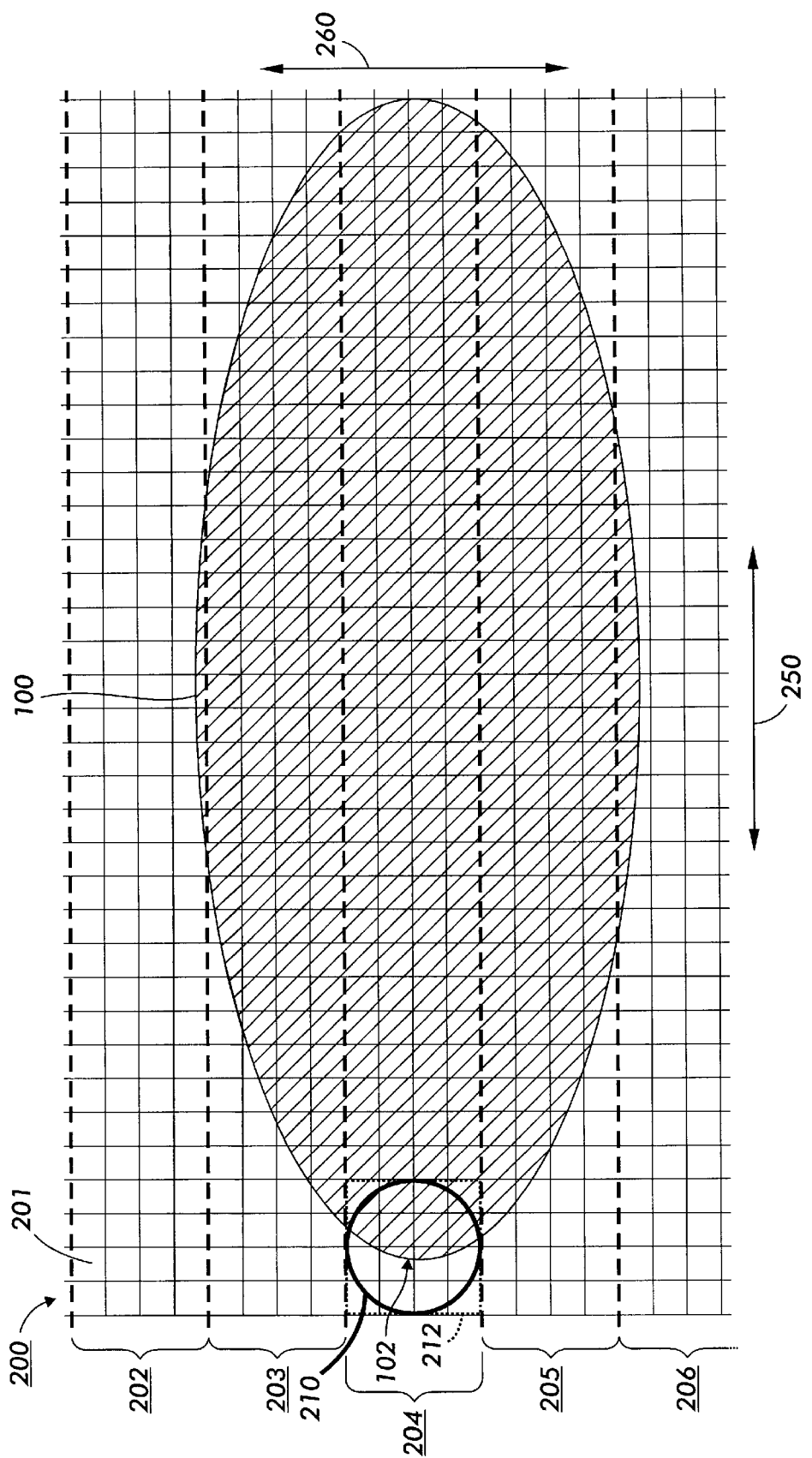
FIG. 1 shows an exemplary image structure, such as a halftone dot, and a sample window that is aligned with a portion of the exemplary halftone dot that crosses the "horizontal" edges of the sample window.
Figure 18:
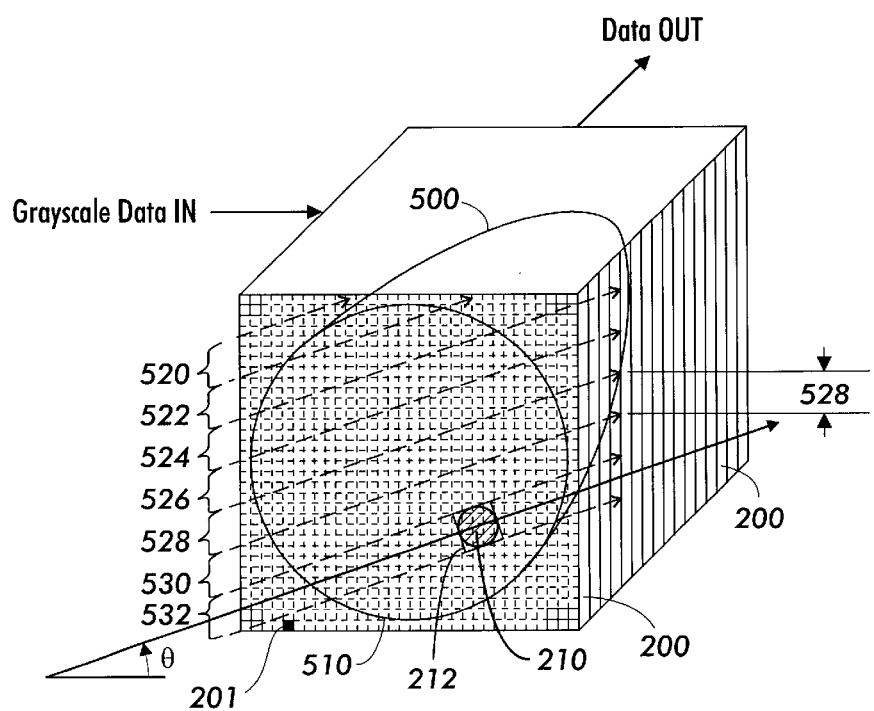
FIG. 18 is a diagram of a look-up table used to implement a particular halftone dot shape function.

FIG. 1 shows a halftone dot 100. As shown in FIG. 18, the size and shape of the halftone dot 100 in the grid or halftone cell 200 of high addressability areas 201 for any given intensity value is determined by taking a two-dimensional slice through a three-dimensional object that presents the halftone dot shape function for all possible discrete intensity values. As shown in FIG. 18, each slice through the three-dimensional shape represents a different intensity value. It should be appreciated that, in FIG. 1, the halftone dot 100 has been stretched out along the horizontal axis to emphasize the systems and methods of this invention relative to "horizontal" image edges.

In particular, as shown in FIGS. 1 and 18, the halftone cell grid 200 of high addressability areas 201 are divided into a plurality of raster scanlines 202–206. In particular, each of the raster scanlines 202–206 defines a path, along a fast scan direction 250, of a modulated light beam 210 as the modulated light beam 210 is scanned across a photoreceptor drum or belt. Each of the scanlines 202–206 is laterally adjacent to the previous and subsequent ones of the scanlines 202–206 along a slow scan direction 260.

As shown in FIGS. 1 and 18, as a sampling window 212 that encloses the light spot 210 is scanned through the halftone cell grid, or high addressability space, 200, the intersection of the sample window 212 and the shape of the halftone dot 100 for the current intensity value to be produced is analyzed to determine how to modulate the light beam 210.

In particular, when the sample window 212 does not intersect the halftone dot 100, the appropriate modulation is easily determined to be "off". Likewise, when the sampling window 212 is completely within the bounds of the halftone dot 100, the modulation is easily determined to be completely on. In general, in the following description, the terms "white" will be used to refer to those instances in which the modulation of the light spot 210 is determined to be off, while the term "black" will be used for those situations when the light spot 210 is on". In general, because the image forming apparatus uses a binary process, where the modulation is either fully on or fully off, it is not possible to form grayscale images directly. Rather, grayscale images are simulated using halftone dots, as is well known in the art.

In general, in the following descriptions, the edges of the sampling window 212 that are parallel to the fast scanned direction 250 and which extend along the scanlines 202–206 will be referred to as the "slow scan edges" and/or the "horizontal edges". In contrast, the edges of the sampling window 212 that extend along the slow scan direction 260 will be referred to as the "fast scan edges" or the "vertical edges".

Figure 2:
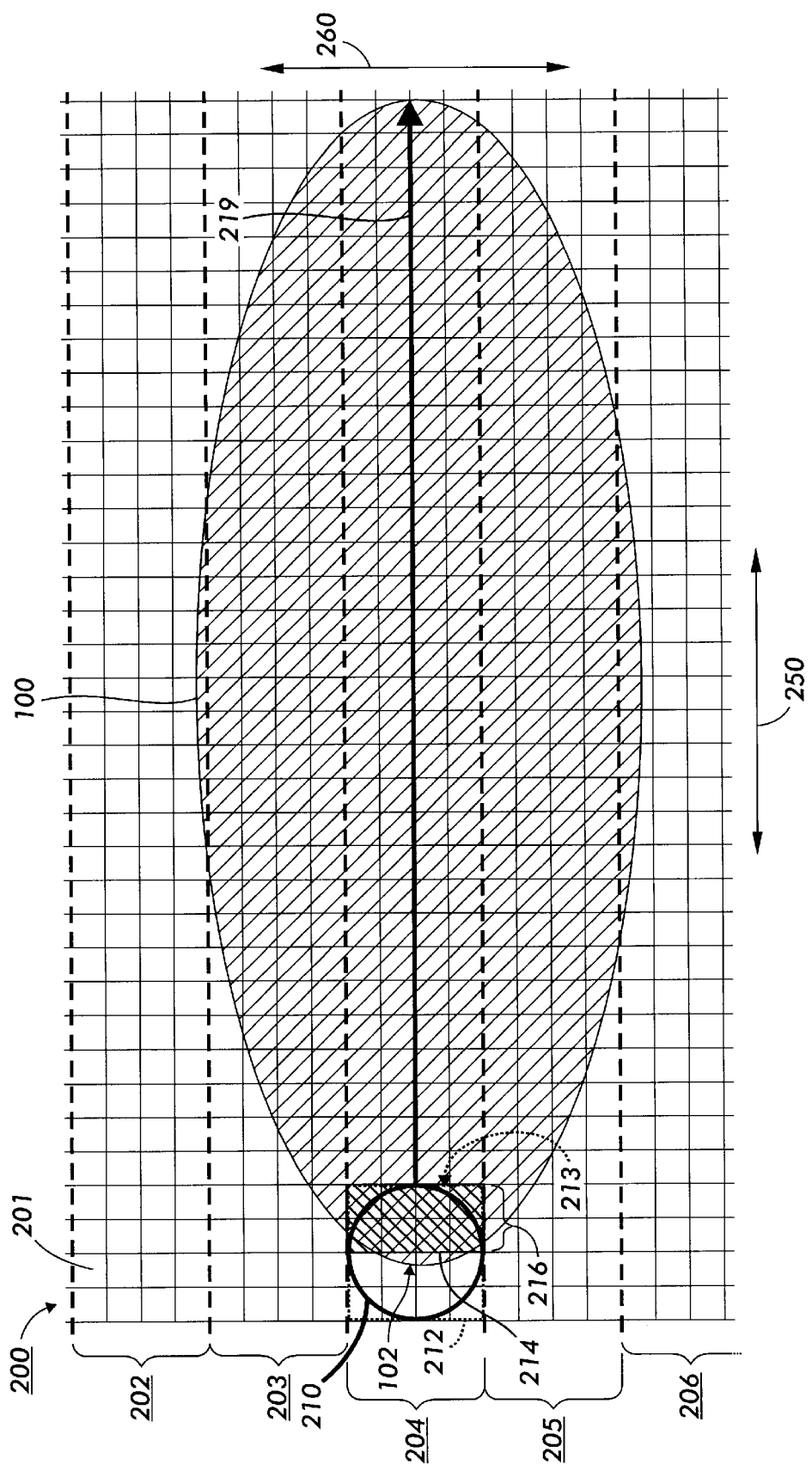
FIG. 2 shows the portion of the sample window that will contribute addressability units to the total area of the printed halftone dot.

As shown in FIGS. 1 and 2, when the sampling window 212 encounters an edge region 102 of a halftone dot 100 to be printed that extends across both of the slow scan or horizontal edges of the sample window 212, it is also easy to determine the beam modulation. As indicated above, each of the individual cells 201 of the high addressability grid 200 in the fast scan direction 250 represent the location that a high addressability edge can be formed in the fast scan direction. Thus, when the sampling window 212 is in the position shown in FIG. 1, the edge of the halftone dot 100 already extends across both of the horizontal edges.

As such, in the manner described in greater detail below, the area of the portion 102 of the halftone dot 100 that lies within the sampling window 212 in the position shown in FIG. 1 is determined by integration. Then, in the manner outlined below, working from the vertical edge 213 of the bounding box 212 that lies within the bounds of the halftone dot 100, a filled portion 214 is formed. In particular, the area of the filled portion 214, shown in FIG. 2, is equivalent to the area of the portion 102 of the halftone dot 100 that lies within the sampling window 212 in the position shown in FIG. 1, rounded off to the nearest addressability unit.

As shown in FIG. 2, the area of the filled portion 214 fills the right-most two columns 216 of the sampling window 212. As a result, if the light beam 210 is scanned across the photoreceptor from left to right, the light beam 210 will be turned on when the trailing edge of the light beam 210 is more or less aligned with the left hand edge of the third column in the scanline 204. Moreover, the light beam 210 will generally remain on until the leading edge of the light spot 210 reaches the right edge of the column indicated by the tip of the arrow 219. At that time, the light beam 210 will be modulated into the off state to stop writing the interior, or black, portions of the halftone dot 100.

Figure 3:
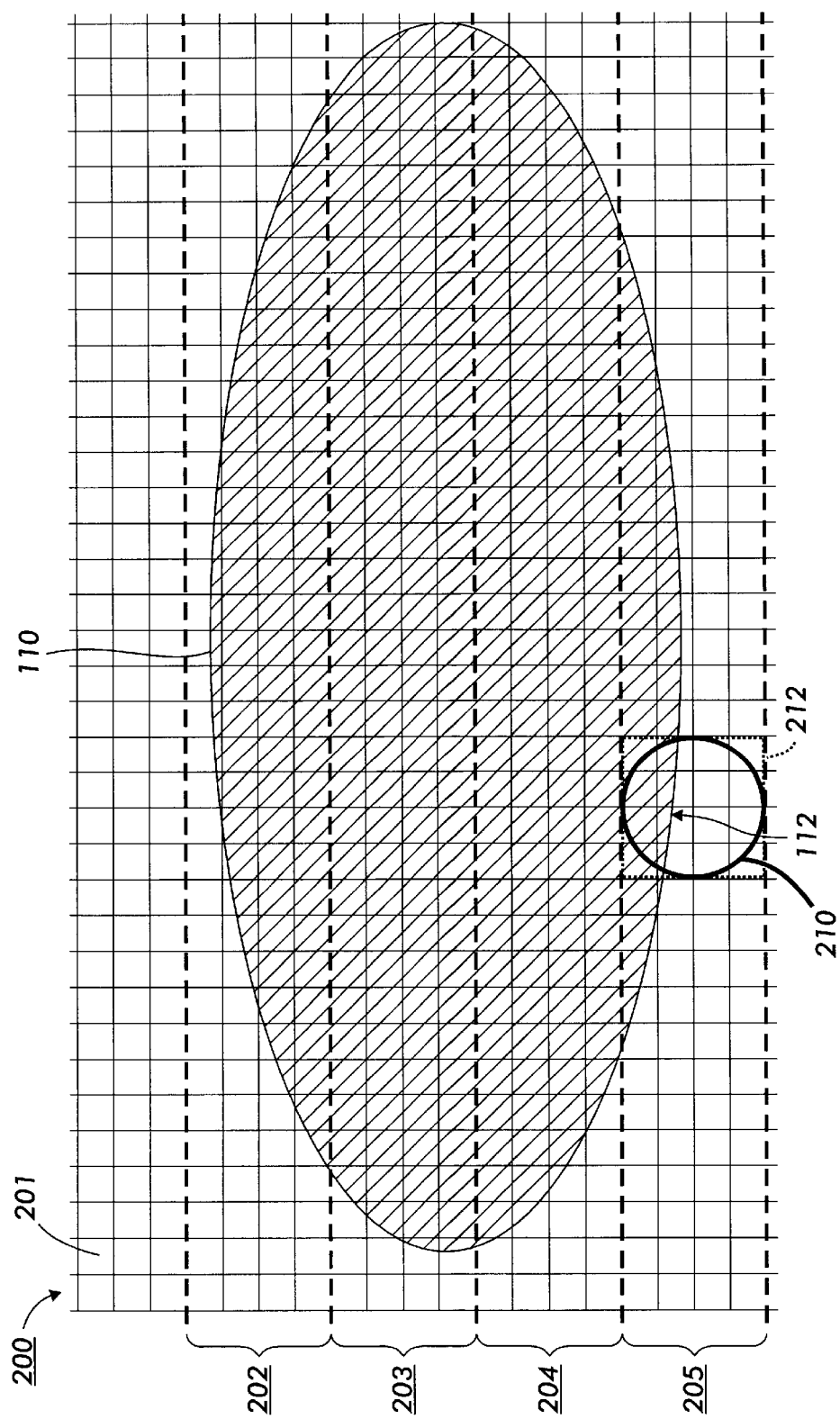
FIG. 3 shows an exemplary halftone dot and a sample window aligned with a portion of the halftone dot that extends across the "vertical" edges of the sample window.

However, as shown in FIG. 3, when the sampling window 210 is positioned relative to a second halftone dot 110 (that has been also expanded in the fast scan direction 250), the edge of the halftone cell 110 passes through the vertical edges of the sampling window 212. Because the halftone dot 110 has a portion 112 that extends into the sampling window 212, the light spot 210 will need to be turned on at some point along the scanline 205, so that the resulting printed halftone dot corresponding to the halftone dot 110 does not omit the portion of the halftone 110 that extends into the scanline 205. If this portion were omitted, the printed halftone dot corresponding to the halftone dot 110 would fail to include all of the density of the halftone dot 110. As a result, the image produced would be considerably lighter than the desired image should be.

Alternatively, the edge extending into the scan line 205 could be "dithered". When dithering, photons are directed towards the portions of the scan line 205 that contains the portion of the halftone dot 110. In general, the photons are attracted to the previously exposed portions of the scan line 204. This has the effect of moving the edge that is aligned to the bottom of the scan line 204 to extend outward into the scan line 205. While the resulting edge is not a really badly drawn edge intensity, it is very noisy because the partial exposure results in a large number of molecules on the photoreceptor to be near the xerographic threshold, and thusly degrading the normally binary response. Thus, while the resulting curve of the exposed portion in the scan line 205 is close to the desired edge of the halftone dot 110, the resulting edge of the exposed portion is still significantly different than the edge of the desired clustered halftone dot of FIG. 17.

In dithering, the light spot 210 is typically toggled on and off as it scans along the scanline 205. The modulation data for the light spot 210 is determined according to the gray value, i.e., the filled percentage, of the sampling window 212 in each position. At the same time, the error in either over printing or under printing is determined and maintained and used as an additional factor for the next position of the sampling window 212 in determining when and where to turn on the light beam 210 and how long to leave it on.

Unfortunately, quickly modulating, i.e., turning on and off, the light beam 210 is noisy. Thus, in a dithered system as outlined above, the halftone data could be subsequently reanalyzed to collect together at least some of the black portions that would be printed along the scanline 205 as outlined above and gather, or cluster, these black portions together. However, this reanalysis of the halftone image data consumes time and processing power. It would be highly advantageous if the image data could be written originally with the image data clustered as outlined above so that the reanalysis portion of this method could be avoided, and yet having the benefits of the low noise associated with clustering.

Figure 4:
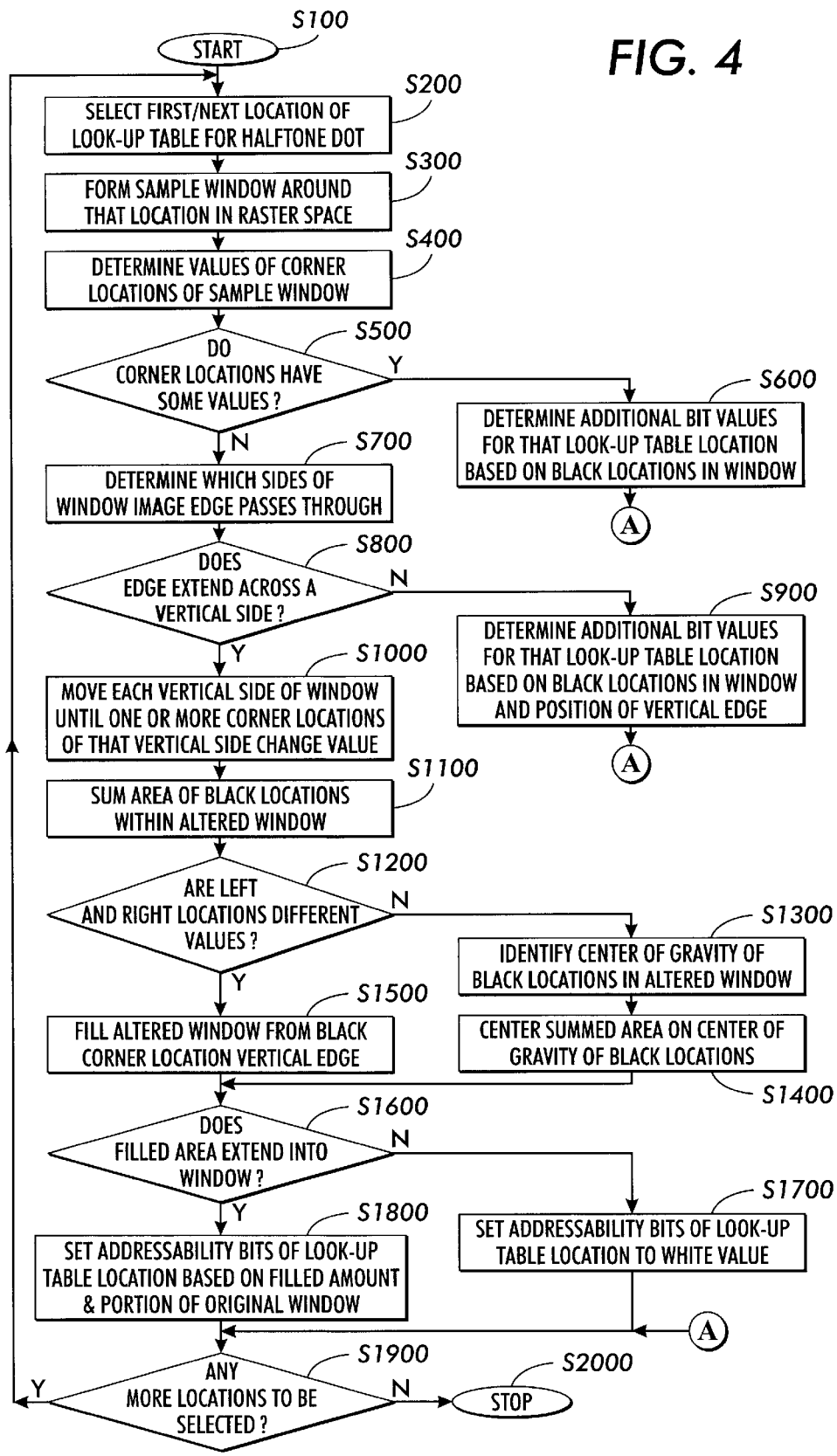
FIG. 4 is a flowchart outlining one exemplary embodiment of a method for determining the portion of the sample window shown in FIGS. 1 and 2 that will contribute to the printed halftone dot.

FIG. 4 is a flowchart outlining one exemplary embodiment of a method according to this invention usable to determine when to modulate the light beam 210 in order to get the modulation data for the light beam 210 as it travels along the scan line 205 that tends to closely correspond to the density of the portion 112 that extends into the sampling window 212 and that tends to result in the black portions of the scan line 205 being clustered together without any further analysis. Thus, as shown in FIG. 4, beginning in step S100, operation continues to step S200, where a first sample location or a next sample location is selected as the current sample location. It should be appreciated that, prior to step S100, one of the slices 200, as shown in FIG. 18, was selected to obtain the shape and orientation of the current halftone dot, as represented in FIGS. 1–3 and 6–13, of the current separation layer based on the grayscale intensity of the image data to be represented by the halftone dot. Next, in step S300, a sample window is formed around the current sample location in a raster space, such as the raster space 200 shown in FIGS. 1–3 and 6–13. Operation then continues to step S400.

In step S400, the image values of the corner locations of the sample window for the current sample location are determined. Next, in step S500, a determination is made whether the image values of the corner locations of the current sample window are identical. If so, operation continue to step S600. Otherwise, operation jumps to step S700. In particular, it should be appreciated that, if the corner locations of the current sample window are the same, i.e., all white, or all black, then the current sample window is assumed to be entirely outside of the current shape of the current halftone dot or is assumed to be entirely within the current shape of the current halftone dot, respectively.

In step S600, the additional bit values for the sample locations in the raster space are determined based on the number and position of the black locations in the window. It is possible, in some instances, that the halftone cell 110 could extend into the sample window 212 in such a way that the corner locations could have the same image value but that the current sample window 212 nonetheless is not entirely within, or entirely outside of, the halftone dot. This does not change the analysis outlined above in step S500. Thus, even if there are portions of the halftone dot 110 that extend into a sample window 212 that has four white corners, the bit values for the sample locations in the raster space contained within the current sample window can still be determined. Similarly, if there are any white sample locations within the sample window 210 even though the four corners of the sample window 210 are all black at the current location, the bit values for the sample locations in the raster space can still be accurately determined. Operation then jumps to step S1900.

Figure 10:
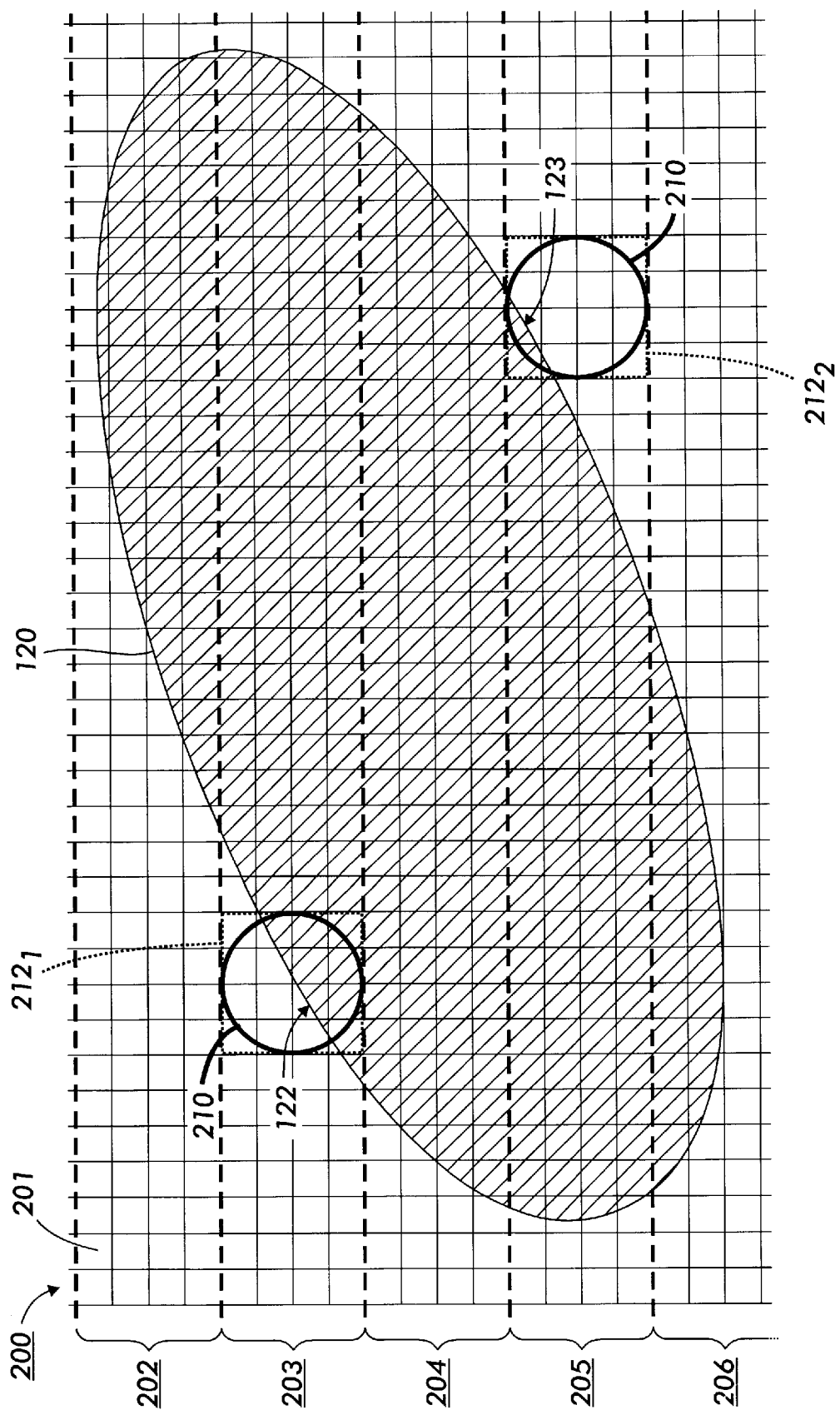
FIG. 10 shows a second exemplary image structure, such as an irrational halftone dot, and two exemplary sample windows having the edge of the image structure extending across at least one vertical window edge.

In contrast, in step S700, the sides of the sample window that the edge of the halftone dot passes through are determined. In general, this is determined based on a comparison of the image values for the four corner locations of the sample window 210, since it is known from step S500 that the corner locations are not all black or all white. Then, in step S800, a determination is made whether the edge of the halftone dot extends across at least one vertical edge of the sample window 210. If the edge of the halftone dot crosses only horizontal window edges, such as shown in FIG. 1, operation continues to step S900. Otherwise, if the edge of the halftone dot 110 crosses at least one of the vertical window edges, such as shown in FIGS. 3 and 10, operation jumps to step S1000.

Figure 13:
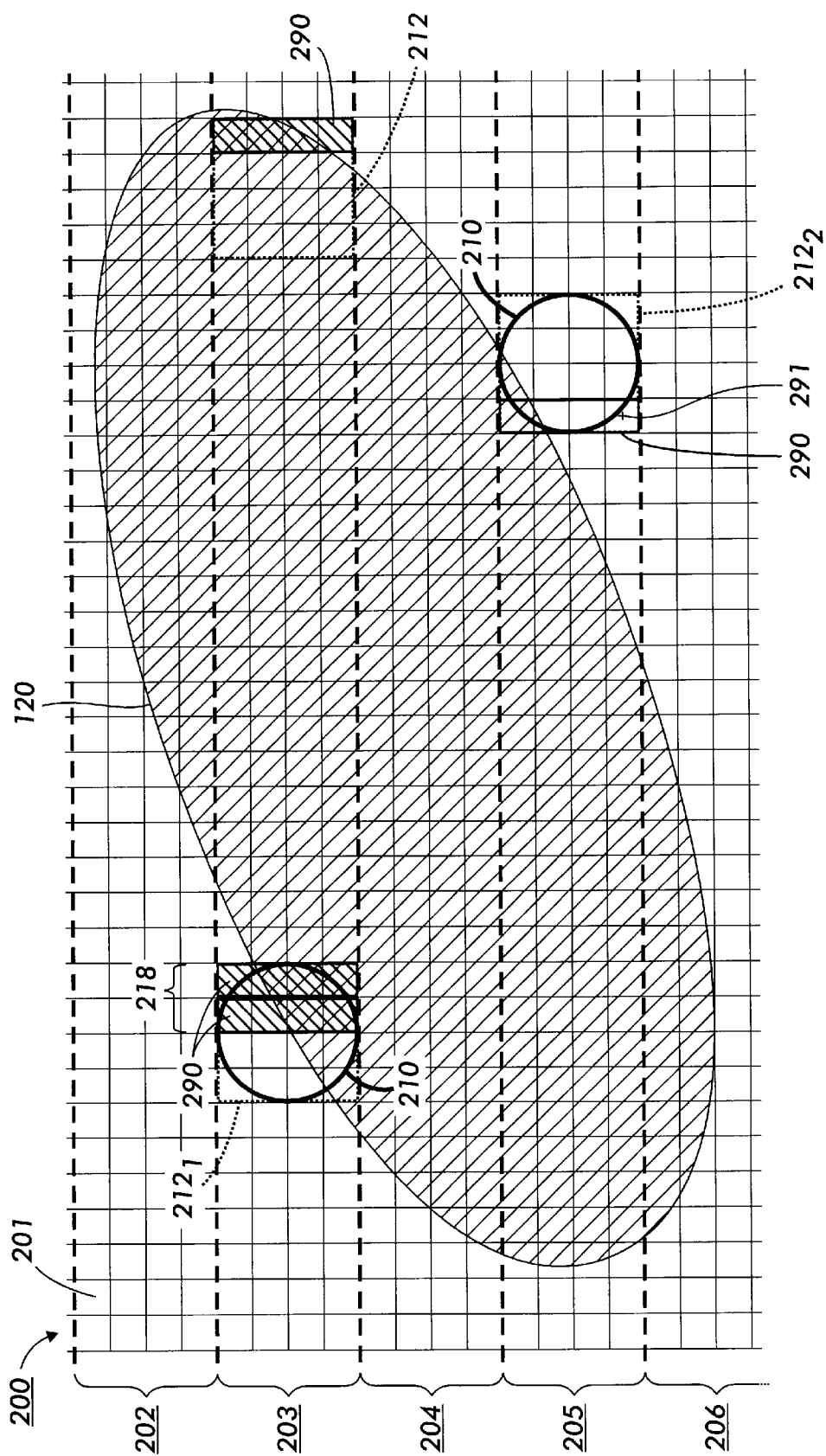
FIG. 13 shows the addressability bits of the sample windows shown in FIG. 10 set according to step S1800.

In step S900, the additional bit values for the high addressability cells 290 in FIG. 13 in the raster space 200 are determined based on the positions of the black cells 291 of the raster space 200 within the current sample window and the position of the vertical edge relative to the current sample window. In particular, as outlined above, the area within the sample window 210 that is also in the halftone dot 100 is determined. Then, starting from the vertical edge that is within the halftone dot 100, the current sample window 212 is filled from that vertical edge until the density of the current sample window 212 is equivalent to the density of the halftone dot 100 contained within the current sample window 212.

In particular, this permits the current sample window 212 to be filled on a fine-grained, that is, almost analog, basis. That is, the density, i.e., fill amount, does not take large discrete jumps to either completely fill or leave completely unfilled a particular high-addressability cell 290 of the raster space 200 within the sample window 212. Rather, portions of a high-addressability cell 290 of the raster space 200 can be filled in. Although only four subunit squares are shown making up one addressability unit in the diagrams, it is easy to subdivide each square subunit further in both the fast and slow directions to increase the accuracy of the integration.

The lateral center of each high-addressability cell 290 within the sample window 212 is then checked to determine if the image value of the lateral center location is set to black or left unchanged based on the amount of filling of the sample window 212 from the vertical edge that lies within the halftone dot 100. That is:

$$I_{i=0-3}(i) = B, \text{ if } I(i+.5, 0.5) = B \quad (1)$$
$$= I(i), \text{ if } I(i+.5, 0.5) = W'$$

where:
I(i) is the image value of the $I^{th}$ high addressability location within the sample window 212, where i ranges from 0 to 3;
I(i+0.5, 0.5) is the image value of the center of the $I^{th}$ high addressability location in the top row of the sample window 212 after filling;
B represents an image value corresponding to a black pixel; and
W represents an image value corresponding to a white pixel.

In particular, Eq. 1 indicates that if the center location is black, then that column or high addressability pixel 290 will be set to black. Otherwise, if that high addressability pixel 290 is white, the current value for that high addressability column is maintained unchanged. Operation then again jumps to step S1900.

In contrast, in step S1000, each vertical side of the current sample window 212 is moved either to the left or to the right, until one or more corner locations of that vertical side changes value from black to white or white to black. Then, in step S1100, the area of the halftone dot that extends into the altered sample window is summed. Next, in step S1200, a determination is made whether the corner locations at the left side or edge of the altered sample window are different from the image values of the corner locations at the right edge. If not, operation continues to step S1300. Otherwise, operation jumps to step S1500.

In step S1300, the center of gravity of the black locations in the altered sample window is identified. Then, in step S1400, the summed area is centered on the center of gravity of the black locations of the halftone dot 110 within the altered sample window. Operation then jumps to step S1600.

It should be appreciated that, in various other exemplary embodiments, rather than using the center of gravity, the geometrical center of the altered sample window could be used instead. Similarly, the center of the summed area can be centered on the center of any other known or later developed characteristic of the portion of the halftone dot 110 that extends into the altered sampling window 210 and/or of the sampling window 210 itself.

In contrast to step S1300, in step S1500, the altered sampling window is filled from the vertical edge that has one or more black corner locations until the filled portion of the altered window has an area that is equal to the summed area determined in step S1100. Control then continues to step S1600. It should be appreciated that, in general, the filling technique outlined in step S1500 will result in the altered window being filled from one vertical edge towards the other vertical edge. However, it is possible that after expanding each vertical side as outlined in step S100, each vertical side of the altered window resulting from step S1000 can have one black and one white corner edge. In this case, the altered window could be filled equally from each of the vertical edges of the altered window toward the center of the altered sample window.

In step S1600, a determination is made whether the filled area of the altered sample window extends into the original, unaltered sample window. If not, operation continues to step S1700. Otherwise, operation jumps to step S1800. In step S1700, the addressability bits of the current sample window are maintained at the previous values. In contrast, in step S1800, the addressability bits of the current sample window are set so that those addressability bits in which the filled amount extends past the center point in the fast scan direction are set to black. All other addressability bits are maintained at their previous image values. Operation then continues to step S1900.

In step S1900, a determination is made whether any more sample locations need to be analyzed. If so, control jumps back to step 200, where a next sample location is selected as the current sample location. Operation again continues to step S300 as outlined above. In contrast, in step S1900, if there are no more sample locations to be analyzed, control continues to step S2000, where operation ceases.

Figure 5A:
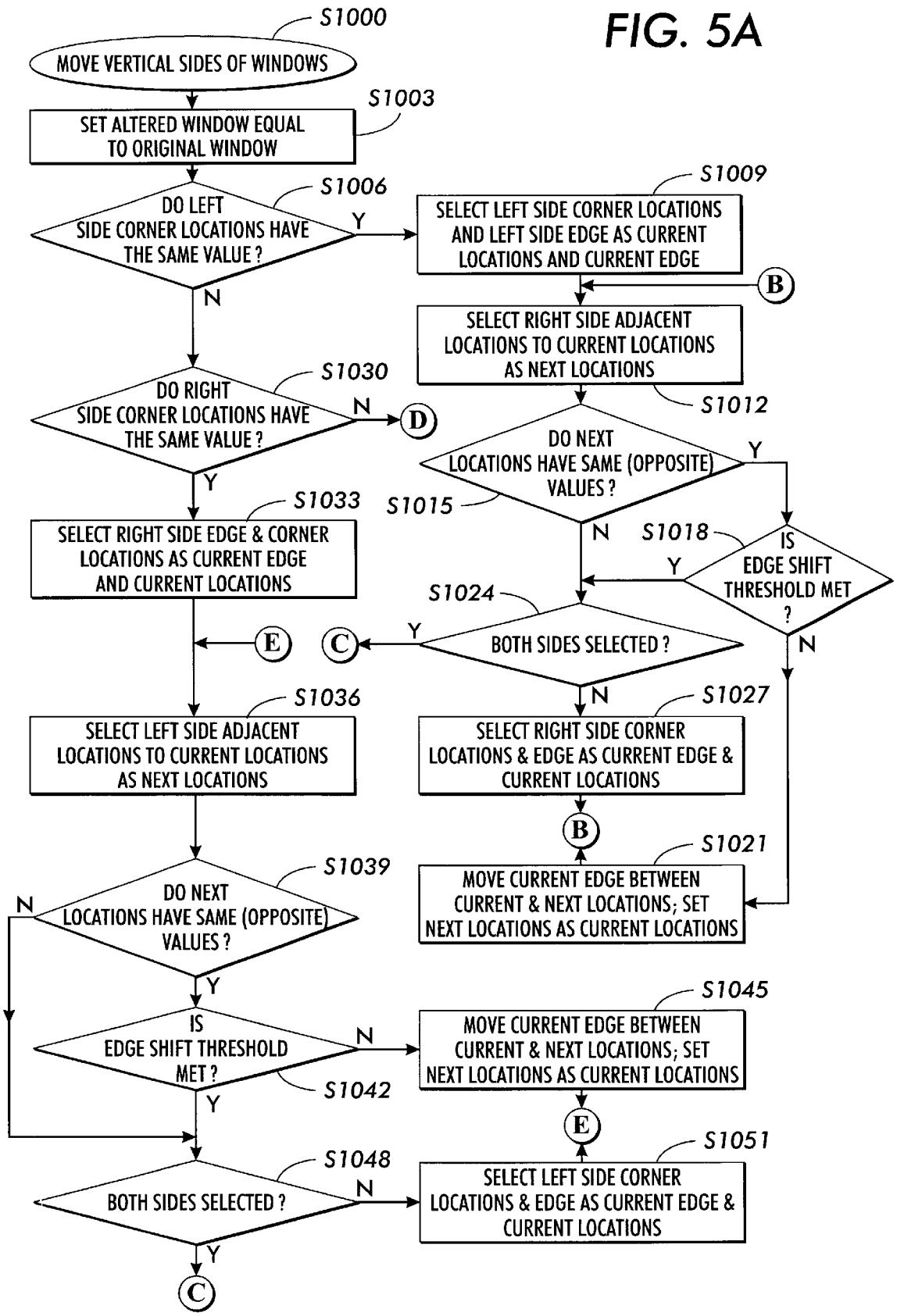
FIGS. 5A and 5B are a flowchart outlining one exemplary embodiment of a method for moving each vertical side of the sample window until one or more current locations of that vertical side changes value according to step S1000 of FIG. 4.
Figure 5B:
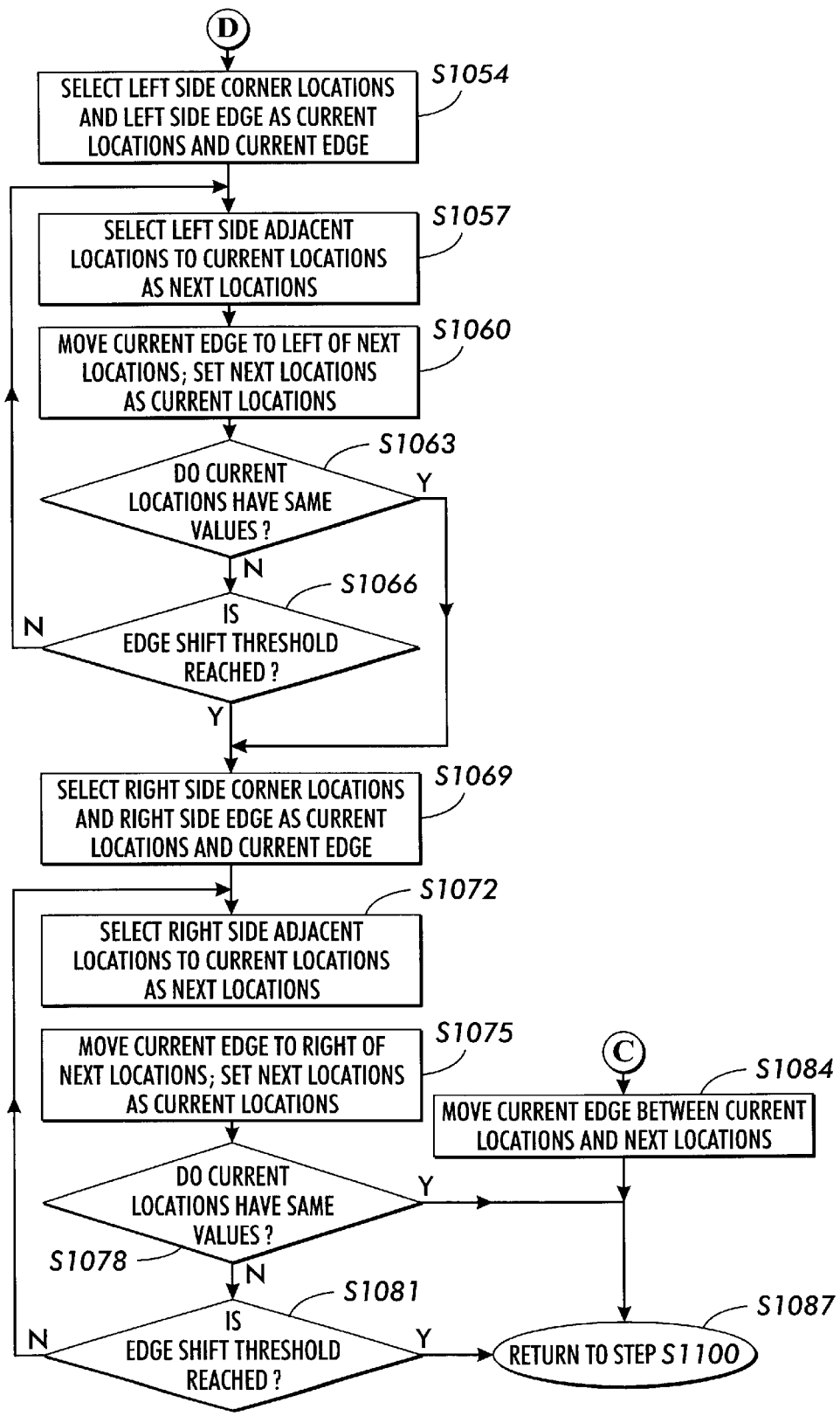

FIGS. 5A and 5B outline in greater detail one exemplary embodiment of the step of moving each vertical side of the current sample window until one or more corner locations of each vertical side changes value of step S1000. Accordingly, beginning in step S1000, operation continues to step S1003, where an altered window is set equal to the original sampled window. Next, in step S1006, a determination is made whether the image value of the left side upper and lower corner locations have the same image value. If so, the edge of the halftone dot 110 does not extend across the left side vertical window edge. Accordingly, operation continues to step S1009. Otherwise, the edge does extend across the left side vertical edge and operation continues to step S1030.

In step S1009, the left side corner locations and the left side vertical window edge are selected as the current corner locations and the current edge. Next, in step S1012, the locations adjacent to the right of the current locations are selected as the next locations. Then, in step S1015, a determination is made whether the next corner locations have the same image value. If so, control continues to step S1018. Otherwise, control jumps to step S1024.

In steps S1006–S1015, because the left corner locations have the same image value, the image edge must extend across the right side vertical window edge and across one of the horizontal edges between the left and right side vertical window edges. Thus, to get one of the corner locations of the left side of the original sample window to change value, the left side vertical window edge must be moved towards the right side vertical window edge.

In step S1018, a determination is made whether an edge shift threshold has been met. In general, in step S1018, this edge shift threshold will be equal to the extent of the original sample window along the fast scan direction 250 for the left vertical window edge and will be a value for the right vertical window edge that corresponds to the distance of the right vertical window edge from the edge of the current halftone cell. If the edge threshold is met, operation again jumps to step S1024. Otherwise, operation continues to step S1021.

In step S1021, the current edge is moved between the current and next locations. At the same time, the next locations selected in step S1012 are reset as the current locations. This, in effect, moves the left vertical window edge of the altered sample window one column at a time to the right of the left vertical window edge of the original sample window. Operation then jumps back to step S1012.

As a result, steps S1012–S1021 are repeated until either the next locations no longer have the same image value or the edge threshold has been met. In either of these cases, operation jumps to S1024. In step S1024, a determination is made whether both the right and left vertical edges of the original sample window have been selected. If so, control jumps to step S1084. Otherwise, operation continues to step S1027, where the right side corner locations and the right vertical window edge are selected as the current locations and the current edge. Operation then jumps back to step S1012. In this operation of step S1012, the corner locations that are adjacent to the right side of the current, i.e., right side, locations are selected as the next locations. Then, in this operation of step S1015, when adjusting the right vertical window edge a determination is made whether the next locations have the opposite, rather than the same, image values. If so, control again continues to step S1018. If not, operation again jumps to step S1024.

In steps S1027, S1012 and S1015, the current right side locations are, by definition of the performance of these steps, different in value because the edge of the halftone dot 110 extends between these locations. Thus, the right side edge of the altered sample window is moved to the right relative to the right side edge of the original sample window until the locations of the right side edge of the altered sample window are no longer different, i.e., the edge of the halftone cell no longer extends across the right vertical window edge.

In this operation of step S1018, a determination is made whether the current edge shift threshold for the current location of the original sample window has been met. If so, even though the edge of the halftone cell 110 continues to extend across the right vertical edge, the altered sample window has reached the bounds of the halftone cell for the current halftone dot. If the altered ample window were to continue to be expanded beyond the threshold, the altered sample window would extend into another halftone dot and start analyzing the halftone dot for a different portion of image data. Thus, even if the edge of the halftone dot continues to extend across the right vertical window edge, it is not appropriate to continue to expand the altered sample window in this case. Accordingly, operation jumps in this case to step S1024. Otherwise, if the edge shift threshold has not been met, operation continues to step S1021.

In this operation of step S1021, the current edge is again moved between the current and next locations and the next locations are set as the current locations. Operation again returns to step S1012. It should be appreciated that, for both the left and right side vertical window edges, the current edge is moved to the right only when there is not a change of status of the location of the edge of the halftone dot 110 relative to each of the left and right vertical window edges. That is, the left vertical window edge is moved as long as the corner locations of the left vertical window edge are the same in the altered sample window.

However, once the next corner values of the left vertical window edge do not have the same values, the edge is not moved. That is, the left vertical window edge is not moved so that the edge of the halftone cell 110 extends across it, but rather the left vertical window edge is moved to just to the left of the location where the edge of the halftone dot 110 would extend across the left vertical window edge. Similarly, the right vertical window edge is moved only so long as the values of the right corner locations are different. Once it is determined that lower next corner locations of the altered sample window have the same image value, the right vertical window edge is not moved. Thus, the right vertical window edge stays to the left of the location where the edge of the halftone dot 110 would no longer cross the right vertical edge. Once step S1024 has been reached for both the left and right sides, operation jumps to step S1084.

In contrast to step S1012, step S1030 is reached only if the left upper and lower corner locations do not have the same value, i.e., the edge of the halftone cell extends across the left vertical window edge. Then, in step S1030, a determination is made whether the right corner locations have the same image value. If not, the edge of the halftone dot 110 also extends across the right vertical window edge. In this case, operation jumps to step S1054. Otherwise, the edge of the halftone dot 110 does not extend across the right vertical window edge, and instead extends across one of the horizontal window edges extending between the right and left vertical window edges. In this case, operation continues to step S1033.

In step S1033, the right side vertical window edge and the upper and lower right side corner locations of the altered sample window are selected as a current edge and corner locations. Next, in step S1036, the corner locations adjacent to the left of the current locations are selected as the next locations. Then, in step S1039, a determination is made whether the next locations have the same image value. If not, operation jumps directly to step S1048. Otherwise, if the next corner locations have the same image value, operation continues to step S1042.

In step S1042, a determination is made whether an edge shift threshold for the current edge has been met. If not, operation continues to step S1045. Otherwise, if the edge shift threshold has been met, operation jumps to step S1048.

It should be appreciated that, in step S1042, the edge shift threshold for the right vertical window edge, like the threshold in step S1018 for the left vertical window edge, is less than the extent of the original sample window along the fast scan direction 250. In contrast, for the left vertical window edge, the edge shift threshold in step S1042, like the edge shift threshold in step S1018 for the right side vertical window edge, is based on the distance of the left or right vertical window edge to the edge of the halftone cell for the halftone dot 110 when moving to the left or right, respectively.

In step S1045, the current edge is moved between the current and next locations, i.e., to the left, and the next locations are selected as the current locations. Control then jumps back to step S1036. It should be appreciated that the loop formed by steps S1036, S1039, S1042 and S1045 continues until either the edge shift threshold is met or the next locations selected in step S1036 no longer have the same image values. In either case, operation continues to step S1048, where a determination is made whether both the left side and right side vertical edges have been selected. If so, operation again jumps to step S1084. Otherwise, operation continues to step S1051.

In step S1051, the left side corner locations and the left vertical edge are selected as the current corner locations and the current edge. Operation then again returns to step S1036, where the adjacent locations to the left of the left side corner locations are selected as the next locations. Then, in this operation of step S1039, a determination is made whether the next locations have opposite image values. As outlined above with respect to step S1015, in this operation of step S1039, the edge of the halftone dot 110 extends across the left side vertical window edge. Thus, step S1039 stops the edge shift routine if the edge no longer extends across the left vertical window edge. If the next locations continue to have opposite image values, control continues to step S1042. Otherwise, operation jumps to step S1048. In step S1042, as outlined above, a determination is made whether the edge shift threshold for the left vertical window edge is met. If not, operation again continues to step S1045. Otherwise, operation again jumps to step S1048.

As outlined above, this loop of steps S1036–S1045 continues until either the edge shift threshold is met, or the next locations no longer have opposite image values. Once either of these conditions occurs, operation jumps to step S1048, where a determination is made whether both the left and right vertical sides have been selected. Since step S1048 is reached the second time only if both the left and right vertical window edges have been selected, operation invariably jumps to step S1084 the second time step S1048 is performed.

As outlined above, step S1054 is reached only when the edge of the halftone dot 110 extends across both the right and left vertical window edges. In this case, both the right and left vertical window edges must be moved outward away from the center of the original sample window. In this case, steps S1054–S1081 generally correspond to the right window edge loop through steps S1012–S1027 and the left vertical window edge loop through steps S1036–S1051.

Thus, in step S1054, the left side corner locations and the left side vertical window edge are selected as the current locations and the current edge. Then, in step S1057, the locations adjacent to the left of the current locations are selected as the next locations. Next, in step S1060, the current left vertical window edge is moved to the left of the next locations and the next locations are set as the current locations. Operation then continues to step S1063.

In step S1063, a determination is made whether the current locations have the same image values. If so, the edge of the halftone dot 110 no longer crosses the left vertical edge. Operation thus jumps to step S1069. If not, the edge of the halftone dot 110 continues to cross the left vertical edge. Operation thus continues to step S1066.

In step S1066, a determination is made whether the edge shift threshold for the left edge of the current original sampled image has been reached. If so, again operation continues to step S1069. If not, operation jumps back to step S1057. Thus, the operation outlined in steps S1054–S1066 continues until the edge of the halftone dot 110 no longer crosses the left vertical window edge or until the edge of the current halftone cell is reached.

In step S1069, the right side corner locations and the right side vertical edge are selected as the current locations and the current edge. Next, in step S1072, the locations adjacent to the right side of the current locations are selected as the next locations. Then, in step S1075, the current right vertical window edge is moved to the right of the next locations, and then the next locations are set to the current locations. Operation then continues to step S1078.

In step S1078, a determination is made whether the current locations have the same image value. If so, the edge of the halftone dot 110 no longer crosses the right vertical window edge. Accordingly, operation jumps to step S1087. Otherwise, the edge of the halftone dot 110 continues to cross the right vertical window edge. Thus, operation continues to step S1081.

In step S1081, a determination is made whether the edge shift threshold for the right vertical window edge of the current original sample window has been reached. If so, the altered window has been extended to reach to the next halftone cell and operation again jumps to step S1087. Otherwise, operation jumps back to step S1072. The loop defined in steps S1069–S1081 thus continues to expand the altered sample window to the left until either the edge of the halftone dot 110 no longer crosses the left vertical window edge or the edge of the halftone cell to the left is reached. Similarly, the loop defined in steps S1072–S1081 continues to expand the right vertical window edge of the altered sample window 212 to the right until either the edge of the halftone dot 110 no longer crosses the right vertical window edge or until the edge of the halftone cell to the right is reached.

In step S1084, the current edge is moved between the current and next locations to ensure that the edge of the halftone dot 110 no longer crosses that vertical edge. Operation then continues to step S1087, where operation returns to step S1100.

Figure 6:
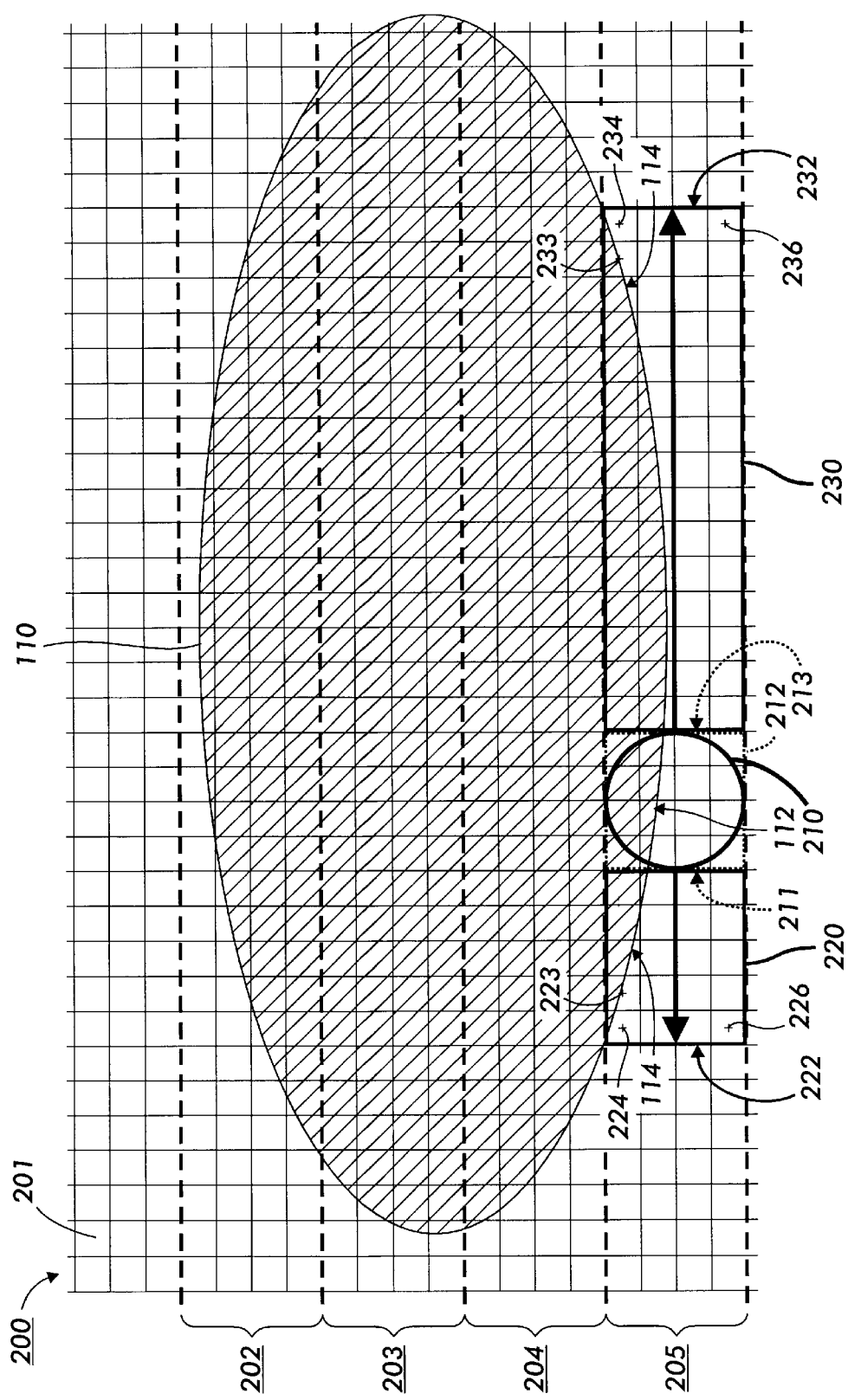
FIG. 6 illustrates the sample window of FIG. 3 altered according to step S1000 of FIGS. 4, 5A and 5B.

FIGS. 6–13 illustrate the operation of step S1000, as outlined above in FIGS. 5A and 5B, for a number of different original sample windows 212, 212$_1$, and 212$_2$ that have the edge of the halftone cells 110 or 120 cross one or more of the left and right vertical window edges of the sample window 212. FIG. 6 shows the sample window 212 and the halftone dot 110 shown in FIG. 3 after being altered according to step S1000 of FIGS. 4, 5A and 5B. In particular, the altered sample window 212 shown in FIG. 6 includes an altered left side portion 220 and an altered right side portion 230 in addition to the original sample window 212. In particular, the left edge 211 is moved five columns to the left to the position taken by the altered left edge 222. The left altered portion 220 now encloses an additional portion 114 of the halftone dot 110. Similarly, the right edge 213 of the sample window 212 is moved 15 columns to the right to form the right-hand expanded portion 230 having a right-hand edge 232.

In particular, as shown in FIG. 6, the high addressability cell 223, like the upper left corner high addressability cell of the original sample window 212 has a black image value at its center position. In contrast, the upper left corner high addressability cell 224 of the expanded left portion 220 has a white image value at its center position. Since, according to step S1063, the upper and lower left-hand current locations 224 and 226 have the same image value, the expansion of the original sample window 212 to the left is complete.

Similarly, the expanded right portion 233 also encloses an additional portion 114 of the halftone dot 110. Like the upper right-hand corner addressability cell of the original sample window 212, the high addressability cell 233 has a black image value at its center position. In contrast, the addressability cell 234 has a white image value at its center position. Thus, because, according to step S1078, both the upper and lower right-hand high addressability cells 234 and 236 now have the same image value, the expansion of the right side portion 230 is complete.

Figure 7:
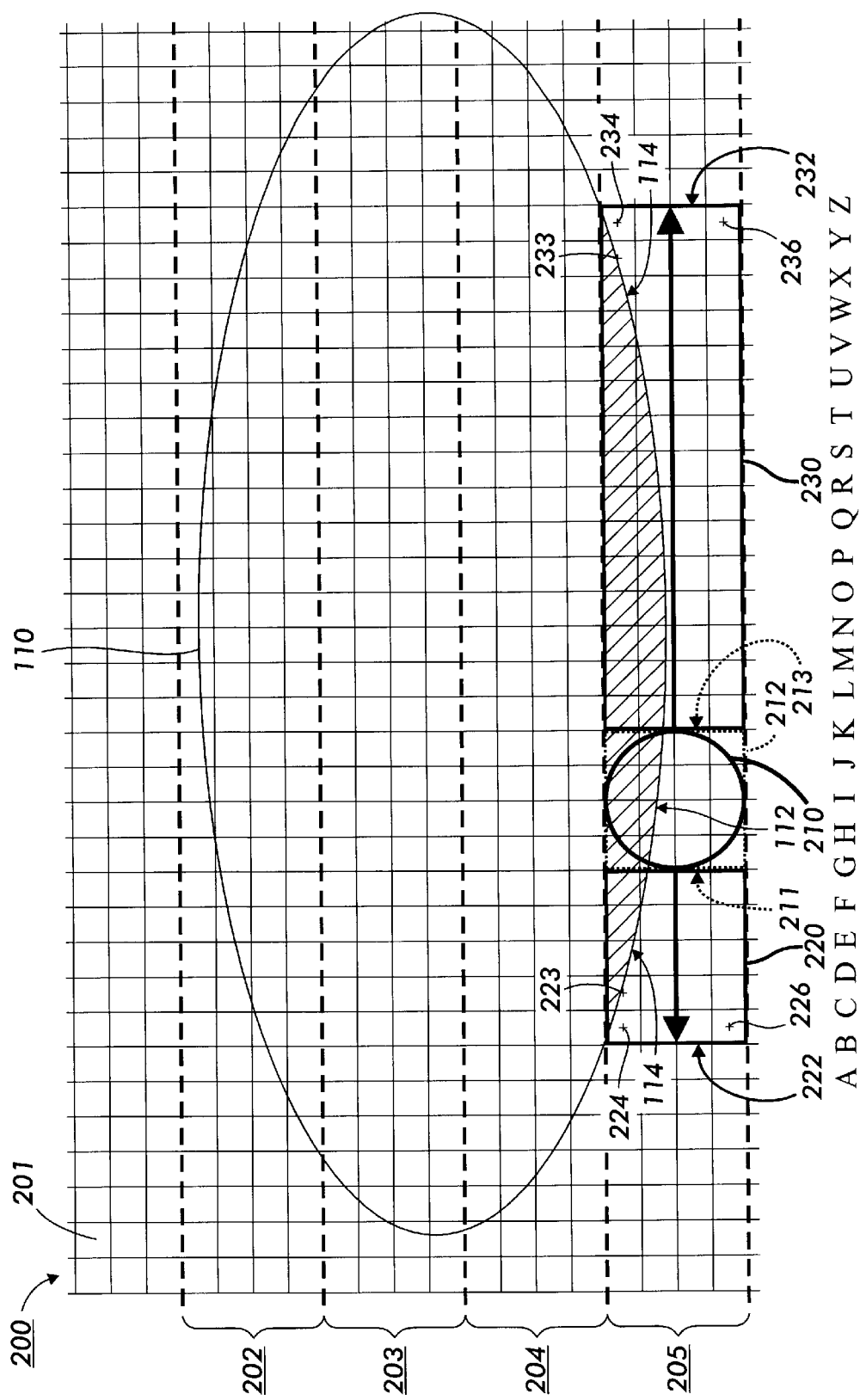
FIG. 7 illustrates the portion of the exemplary image structure shown in FIG. 3 that is within the expanded window shown in FIG. 6.

Next, as shown in FIG. 7, in accordance with step S1100, the area of the halftone dot 110 within the altered sample window 212, formed by the window portions 210, 220 and 230, is summed. This corresponds to the halftone dot portions 112 and 114 as shown in FIG. 7. Then, in FIG. 8, a block having a corresponding area to the summed area determined in step S110 is formed and aligned with the center of gravity and/or the lateral geometric center of the portion of the halftone dot 110 formed by the enclosed portions 112 and 114. All of the corner high-addressability cells 224, 226, 234 and 236 have the same value. Thus, in the determination in step S1200, operation continues to step S1300, where the center of gravity or lateral geometric center is determined, and then to step S1400, where the block 214 is centered on the determined center of gravity and/or geometric center.

Figure 8:
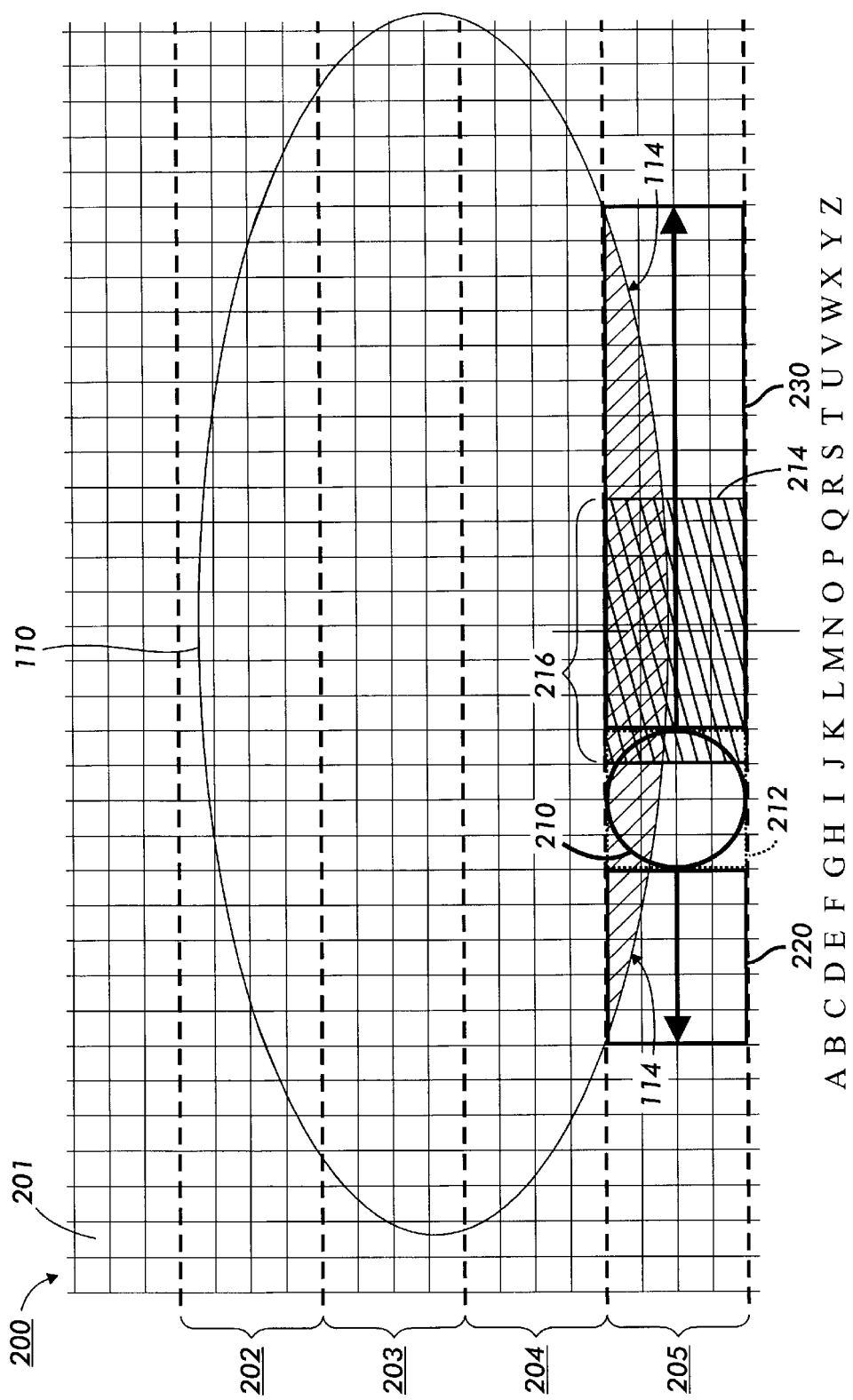
FIG. 8 shows the summed area within the image structure shown in FIG. 3 determined according to step S1100 of FIG. 4 and aligned with the center of gravity of the portion of the image structure within the expanded window as shown in FIG. 7.
Figure 9:
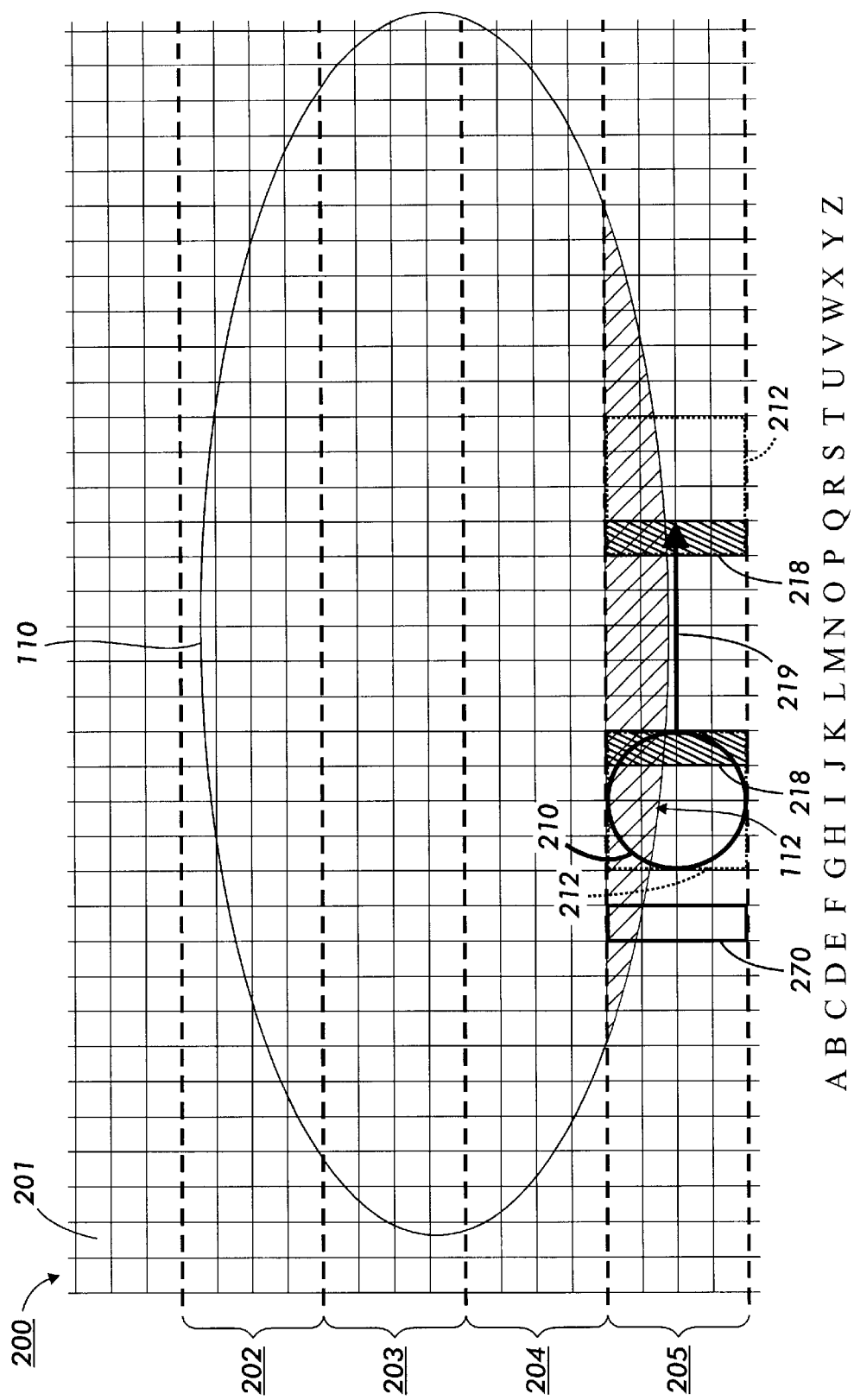
FIG. 9 illustrates the addressability bits that are set based on the intersection between the original sample window and the filled portion of the expanded window determined in steps S1300 and S1400 of FIG. 4.

Then, as shown in FIG. 9, the high addressability cells in the original sample window 212, which corresponds to the columns G–J as shown in FIGS. 8 and 9, are analyzed to determine which ones of the columns G–J the block 216 extends into. In particular, a column or high addressability cell 270 will be determined as being overlapped by the block 216 if the block 216 extends over the center position of that column or high addressability cell 270. As shown in FIG. 9, the right-most column J of the sample window 212 is the only column having a center position that the block 216 extends over. Accordingly, the high addressability cell 218 of the scan line 205 will be printed as black.

It should be appreciated that, for any sample window 210 whose right edge 213 is to the left of column J and is to the right of column C will result in the same altered sample window 212 shown in FIG. 7. Likewise, any sample window 212 whose left edge 211 is to the right of column J and is to the left of column Y will also result in the same altered sample window 212 shown in FIG. 7. In contrast, any sample windows 212 whose right edge is to the left of column C or whose left edge is to the right of column Y will have four white pixels at its corner positions. Thus, sample windows 212 having those positions will not be altered.

Moreover, even for original sample windows 212 that include one or more of columns C–X, only those original sample windows 212 that include columns J–P will have at least one column having a center position the block 216 extends over. However, each of the columns J–P will all be covered by the block 216. Thus, all of the image density of the portions 112 and 114 of the halftone dot 110 that extend into the scanline 205 will be represented by a single contiguous block extending between columns J and P. Thus, the image density of the halftone block 210 that extends into the scanline 205 is maintained, while high frequency modulations of the light beam 210 are avoided.

Figure 11:
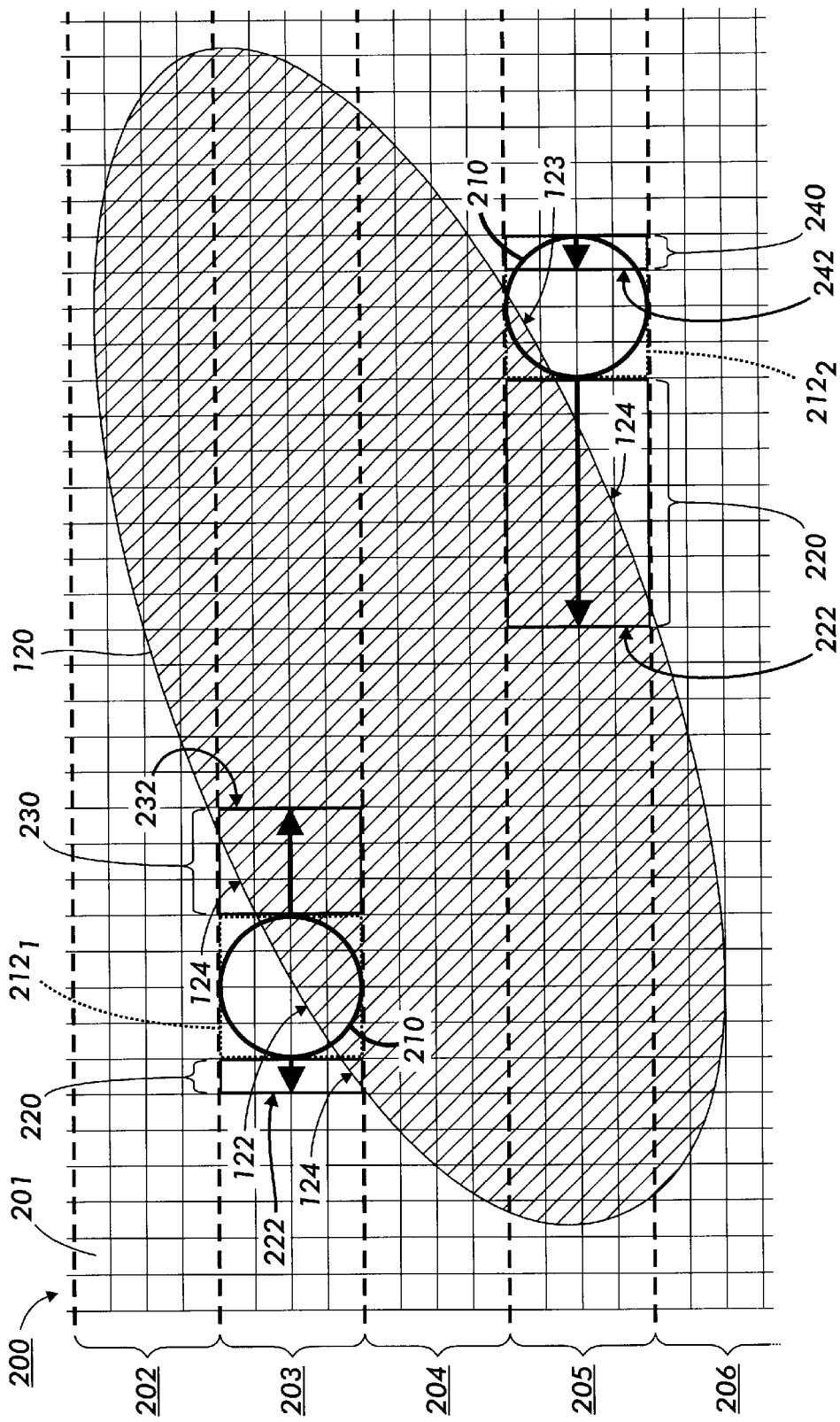
FIG. 11 illustrates the altered sample windows formed according to step S1000 for each of the sample windows as shown in FIG. 10.

FIG. 10 shows two other original sample windows $212_1$ and $212_2$ positioned relative to an obliquely angled halftone dot 120. As shown in FIG. 10, the sample window $212_1$ encloses a portion 122 of the halftone dot 120, while the sample window $212_2$ encloses a portion 123 of the halftone dot 120. As shown in FIG. 11, the sample window $212_1$, like the sample window 212 shown in FIGS. 6–9, is expanded in both the left and right directions to form the expanded portions 220 and 230 having left a edge 222 and a right edge 232. The expanded portions 220 and 230 encompass additional portions 124 of the halftone dot 120 in addition to the originally included portion 122.

However, unlike the original sample windows 212 and $212_1$, the original sample window $212_2$ itself has the upper and lower right-hand corner locations having the same image value. Thus, as shown in FIG. 5A, in step S1030, instead of jumping to step S1054, as in the previous two examples of the original sample windows 212 and $212_1$, in this exemplary sample window $212_2$, operation continues from step S1030 to step S1033. In particular, as shown in FIG. 11, an expanded left portion 220 having a left edge 222 extends into the halftone dot 120 and encloses an additional portion 124 of the halftone dot 120. In contrast, the right edge 213 of the original sample window $212_2$ is moved one column to the left to establish a reduced sample window portion 240 having a right edge 242 that lies within the original sample window $212_2$.

Figure 12:
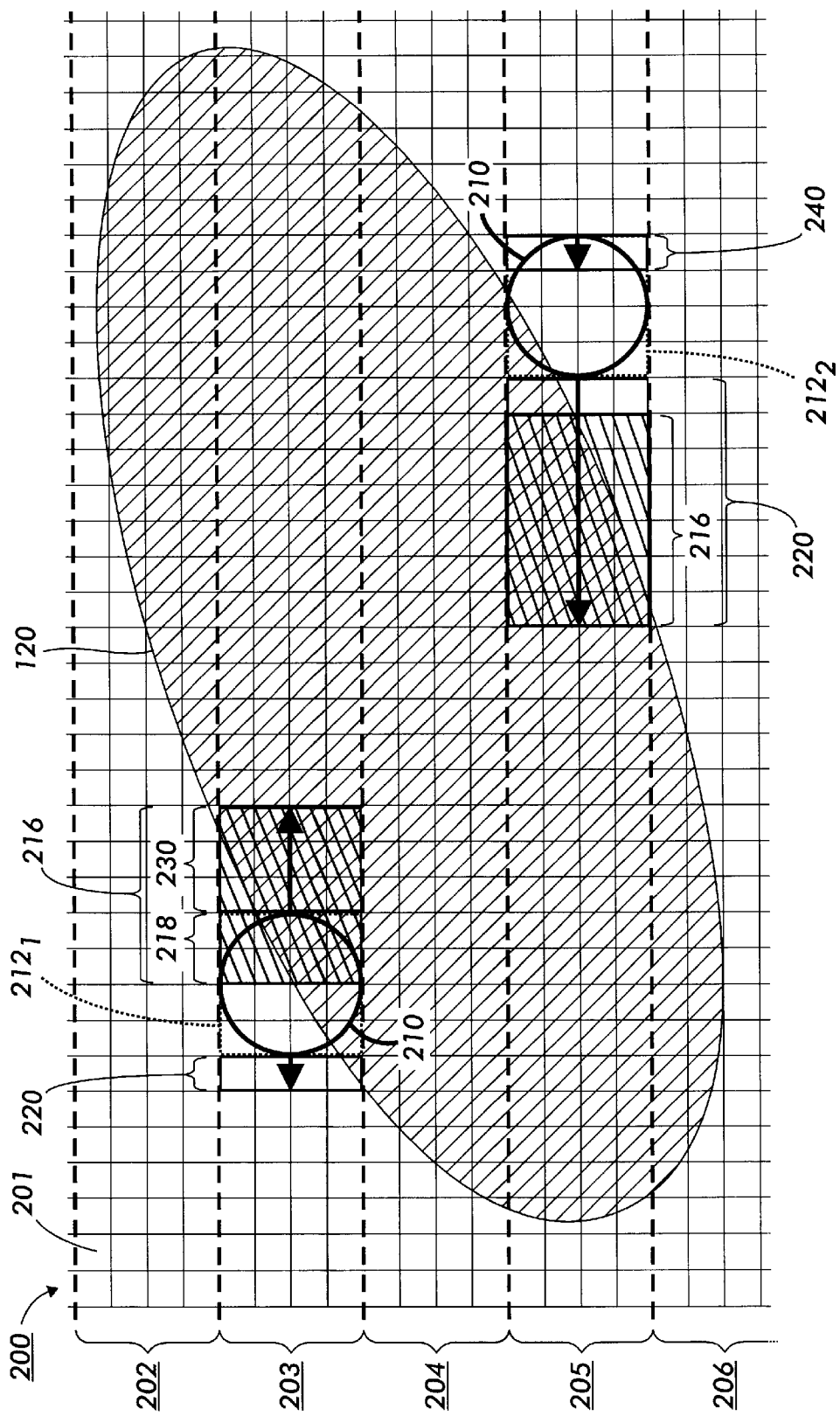
FIG. 12 shows filling the altered sample windows from the vertical edges of the expanded window that lie within the image structure of step S1500 based on the summed area of the image structure within the altered sample window determined is S1100.

FIG. 12 shows the blocks 216 formed by determining the area of the halftone dot 120 that lies within the altered window portions 212, 220 and 230, and 220 and 240, and filling the altered sample window 212, and $212_2$ according to steps S1200 and S1500. In particular, as shown in FIG. 12, unlike the exemplary embodiment of the sample window 212 shown in FIGS. 6–9, the left locations are one image value, and the right locations are a different image value in the altered sample windows $212_1$ and $212_2$. Thus, instead of performing steps S1300 and 1400, as outlined above with respect to FIGS. 6–9, in FIG. 12, step S1500 is performed. In particular, with respect to the sample window $212_1$, because the right side edge 232 extends into the halftone dot 120, the expanded sample window $212_1$ and the expanded portions 220 and 230 are filled from the right side edge 232. In particular, as shown in FIG. 12, the block 216 extends over the center locations of the two right-most high addressability cells 218 of the original sample window $212_1$.

Like the sample window $212_1$, the sample window $212_2$ also has left locations that are different image values from the right locations. In this case, the left edge 222 of the expanded left portion 220 of the sample window $212_2$ lies within the halftone dot 120. Thus, the block 216 begins filling the altered sample window, which is formed by adding the expanded portion 220 to the right side reduced portion 240, from the left side edge 222. However, the block 216 does not extend into the original sample window $212_2$. Thus, none of the original sample window $212_2$ is given a black value. In particular, as shown in FIG. 13, the high addressability cells 218 of the scanline 203 will have black values, as will all of the other high addressability cells in the scanline 203 extending through the high addressability cell 290 at the right edge of the halftone cell 120 within the scan line 203. In contrast, none of the high addressability cells 290 in the original sample window $212_2$ or even the sample window 212 positioned one column to the left of the sample window $212_2$ or any sample windows 212 positioned to the right of the sample window $212_2$, will have black pixels.

FIGS. 14A–14H show one exemplary embodiment of a computer code, written in the C language, that implements in combination, one exemplary embodiment of steps S300–S1800. In particular, in the computer code listing shown in FIGS. 14A–14H, lines 8 and 9 generally correspond to step S300, while lines 10–13 generally correspond to step S400, lines 21 and 298 generally correspond to step S600, lines 60 and 259 generally correspond to step S900, and steps S1000–S1800 map into all the other cases in the code.

Thus, the various cases, such as "case rghtBothWhite", "rghtBotmBlack", and the like, refer to the state of the two right corner locations or the two left corner locations before or after the left and right edges of the original sample window were altered. Because those of ordinary skill in the art will readily be able to understand the computer code listing shown in FIGS. 14A–14H, FIGS. 14A–14H will not be described in further detail.

Figure 15:
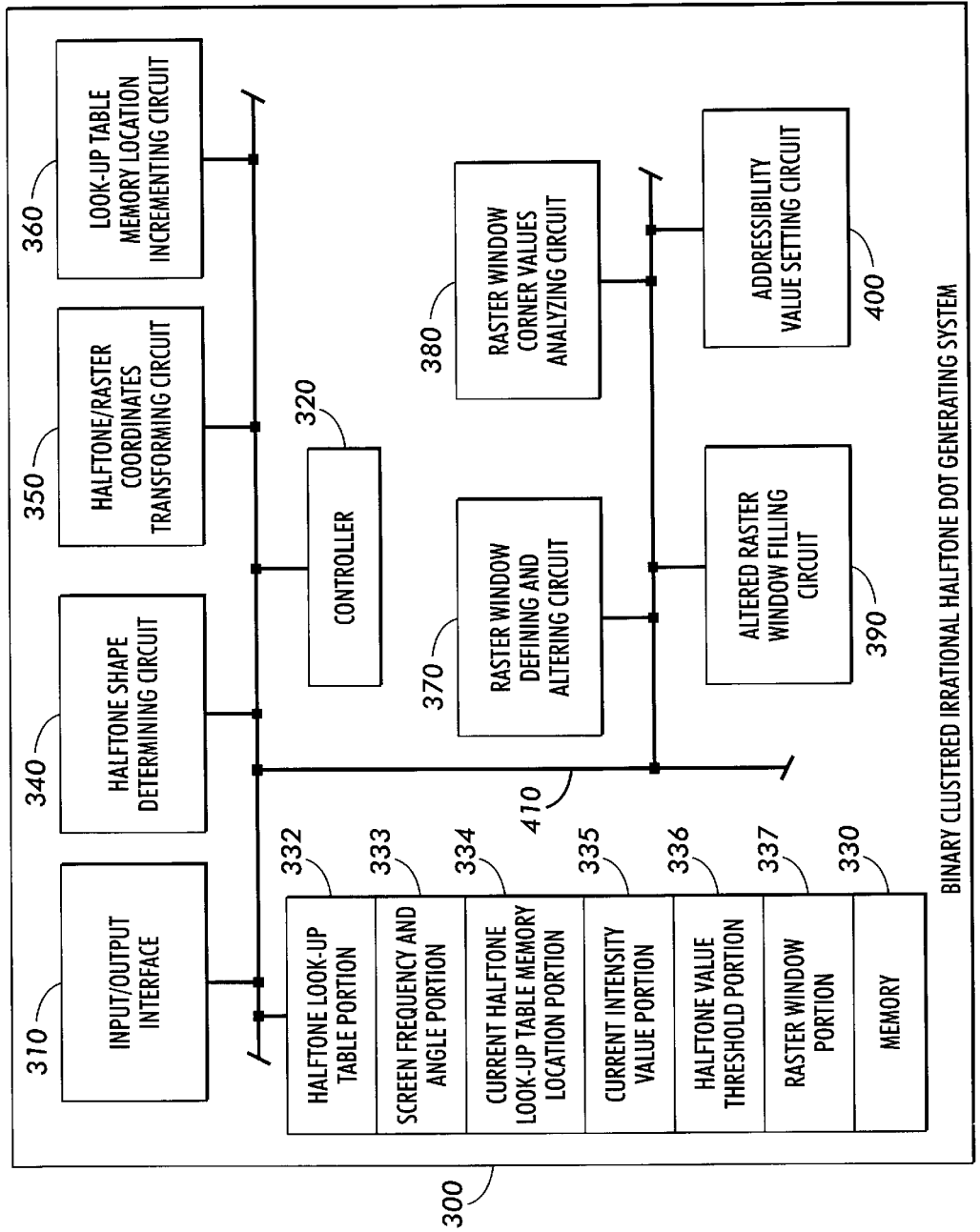
FIG. 15 is a block diagram outlining one exemplary embodiment of a hardware or software system according to this invention.

FIG. 15 is a block diagram outlining one exemplary embodiment of a binary clustered irrational halftone dot generating system 300 according to this invention. As shown in FIG. 15, the binary clustered irrational halftone dot generating system 300 includes an input/output interface 310, a controller 320, a memory 330, a halftone shaped determining circuit or software routine 340, a halftone/raster coordinates transforming circuit or software routine 350, a look-up table memory location incrementing circuit or software routine 360, a raster window defining and altering circuit or software routine 370, a raster window corner values analyzing circuit or software routine 380, an altered raster window filling circuit or software routine 390, and an addressability value setting circuit or software routine 400, each interconnected by one or more buses or application programming interfaces (APS) 410.

The input/output interface 310 can be implemented using any known or later developed hardware device or application programming interface structure usable to connect the binary cluster directional halftone dot generating system 300 to an image data source and/or an image data sink (not shown). In general, the binary clustered irrational halftone dot generating system 300 can be implemented within the overall data processing system of an image forming apparatus, such as a laser printer, an ink jet printer, a digital copier, a facsimile machine, or the like. Alternatively, the binary clustered irrational halftone dot generating system 300 can be implemented as a hardware and/or software system executing on a general purpose computer or the like.

As such, the image data source can be a locally or remotely located computer, a digital camera, a scanner, the scanner subsystem of a digital copier, a facsimile machine, or any known or later developed device that is capable of generating grayscale electronic image data. Similarly, the image data source can be any suitable device that stores and/or transmits grayscale electronic image data, such as a client or a server of a network. The image data source can be integrated with the binary cluster directional halftone dot generating system 300, as in a digital copier having an integrated scanner. Alternatively, the image data source can be connected to a device in which the binary cluster irrational halftone dot generating system 300 is implemented over a connection device, such as a modem, a local area network, a wide area network, an intranet, the Internet, an extranet, any other distributed processing network, or any other known or later developed connection device.

It should also be appreciated that, while the electronic image data can be generated at the time of printing an image from original physical document, the grayscale electronic image data could have been generated at any time in the past. Moreover, the grayscale electronic image data need not have been generated from an original physical document, but could have been created from scratch electronically. The image data source is thus any known or later developed device which is capable of supplying grayscale electronic image data to the binary clustered irrational halftone dot generating system 300.

Similarly, the image data sink can be any known or later developed device that is capable of receiving the halftone electronic image data generated by the binary clustered irrational halftone dot generating system 300 from the grayscale image data received from the image data source, and either storing, transmitting, and/or displaying the halftone grayscale image data. Thus, in general, the image data sink can be any device that is capable of outputting and/or storing the halftone electronic image data generated according to the systems and methods of this invention, such as a printer, a digital copier, any other known or later developed image forming device, a facsimile device, a display device, a memory, or the like.

The memory 330 includes one or more of a halftone look-up table portion 332, a screen frequency and angle portion 333, a current halftone look-up table memory location portion 334, a current intensity value portion 335, a halftone threshold value portion 336, a raster window portion 337, and any other appropriate functionally distinct portion of the memory 330. The memory 330 and the various memory portions 332–337 can each be implemented using any desired combination of non-alterable, non-volatile memory, alterable and non-volatile memory and alterable and volatile memory. Thus, the memory 330 can be implemented using any appropriate combination of alterable, volatile or non-volatile memory, or non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory, a memory stick, or the like. Similarly, the non-alterable or fixed memory can be implemented using any one or more of ROM, PROM, EPROM, EEPROM, and ROM disk, such as a CD-ROM or DVD-ROM disk, and disk drive or the like.

If implemented, the halftone look-up table portion 332 includes a three-dimensional look-up table implementing the particular halftone dot shape function to be used by the binary clustered irrational halftone dot generating system 300. Alternatively, if the halftone look-up table portion 332 is not implemented, the memory 330 stores a set of equations that define the halftone dot shape function.

The screened frequency and angle portion 333 stores data regarding the screen angle Θ, as shown in FIG. 18. The screen frequency data stored in the screen frequency and angle portion 333 defines the size of the halftone cell 200 outlined above. The screen angle Θ stored in the screen frequency and angle portion 333 defines the halftone screen angle. It also defines the orientation of the scanlines through the look-up table stored in the halftone look-up table portion 332, as shown in FIG. 18.

The current halftone look-up table memory location portion 334 stores data defining the slice of the halftone shape function stored in the halftone look-up table portion 332 based on the current grayscale intensity value or the current image portion being analyzed that is stored in the current intensity value portion 335. Alternatively, if the halftone look-up table portion 332 is not implemented, the current halftone look-up table memory location portion 334 stores the halftone dot shape data generated based on the set of halftone dot shape function equations stored in the memory 330 and the current grayscale intensity value of the current portion of the grayscale image stored in the current intensity value portion 335.

The halftone value portion 336 stores the amount of halftone density encompassed by the altered sample window. The raster window portion 337 stores the current location of the sample window, and the size and location of the altered sample window, for each light beam 210 implemented in the image forming apparatus for which the binary clustered irrational halftone dot generating system 300 is generating the halftone dots.

The halftone shape determining circuit or software routine 340, under control of the controller 320 and based on the grayscale intensity value stored in the current intensity value portion 335, selects a particular slice 200 from the three-dimensional halftone dot shape stored in the halftone look-up table portion 332. Alternatively, the halftone shape determining circuit or software routine 340, if the halftone look-up table portion 332 is omitted, uses the set of halftone dot shape function equations stored in the memory 330 and the current grayscale intensity stored in the current intensity value portion 335 to generate on the fly the halftone dot shape for the current grayscale intensity. In either case, the controller 320 then stores the determined slice of the three-dimensional halftone dot shape in the current halftone look-up table memory location portion 334.

Next, under control of the controller 320, the halftone raster coordinates transforming circuit or software routine 350, based on the screen frequency and angle data stored in the screen frequency and angle portion 333, determines the orientation of the halftone dot shape for the current grayscale intensity value stored in the current intensity value portion 335 to align the current slice of the halftone dot shape stored in the current halftone look-up table memory location portion 334 with the raster scanlines. The aligned halftone dot shape is then stored in the current halftone look-up table memory portion 334, along with a current location value that is initially set to the upper left hand corner of the halftone dot cell.

Next, under control of the controller 320, the raster window defining and altering circuit or software routine 370 first defines an original sample window at the current location within the look-up table for the current slice of the halftone dot shape. Next, under control of the controller 320, the raster window defining and altering circuit or software routine 370 and the raster window corner values analyzing circuit or software routine 380 cooperate to determine an altered raster window for the current location within the look-up table for the current slice of the halftone dot shape, as outlined above with respect to FIGS. 6 and 11. The altered sample window is stored in the raster window portion 337.

Based on the size of the altered sample window stored in the raster window portion 337, the altered raster window filling circuit or software routine 390, under control of the controller 320, integrates the amount of the halftone dot shape that falls within the bounds of the altered sample window stored in the raster window portion 337. This is stored in the halftone value portion 336. The altered raster window filling circuit or software routine 390, based on the analysis performed by the raster window corner values analyzing circuit or software routine 380, fills the altered sample window stored in the raster window portion 337 either from the left edge or the right edge of the altered sample window or from a center of gravity, a geometric center, or other central position for some other image characteristic of the altered sample window and/or the enclosed portion of the halftone dot shape.

Finally, under control of the controller 320, the addressability value setting circuit or software routine 400, based on the intersection of the portion of the altered sample window filled by the altered raster window filling circuit or software routine 390 and the original window whose location is stored in the raster window portion 337, determines which, if any, of the high addressability cells within the original sample window is overlapped by the image density of the portion of the halftone dot shape encompassed by the altered sample window. This information is then stored in the memory 330 at the appropriate location, or is output under control of the controller 320 to the input/output interface 310 for storage, transmission and/or use by the image data sink. Then, under control of the controller 320, the look-up table memory end location incrementing circuit or software routine 350 increments the position of the raster window relative to the halftone dot cell stored in the current halftone look-up table memory location portion 334.

Figure 16:
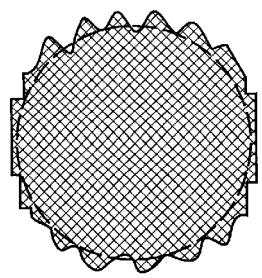
FIG. 16 is one exemplary embodiment of an image structure generated according to the conventional dithering method.
Figure 17:
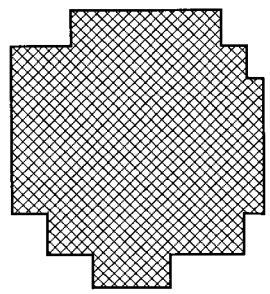
FIG. 17 is a one exemplary embodiment of an image structure generated according to this invention.

FIG. 16 shows one exemplary embodiment of a conventional halftone dot generated by "dithering" the edges of the conventional halftone dot the edges along the fast scan direction. In contrast, FIG. 17 shows a similar halftone dot shape, representing the same grayscale intensity value, produced according to the systems and methods of this invention.

FIG. 18 shows in greater detail one exemplary embodiment of a three-dimensional halftone dot shape distributed among a plurality of two-dimensional halftone cells 200. As shown in FIG. 18, a three-dimensional halftone dot shape, occupies only a small portion of a two-dimensional halftone dot cell at low intensities. The amount of the halftone dot cell 200 occupied by the three-dimensional halftone dot shape increases with increasing grayscale intensity values. Although not shown in FIG. 18, once the circumference 510 of the halftone dot shape 500 reaches the edges of the two-dimensional halftone dot cell 200, as the halftone dot shape keeps growing for increasing intensity values, the halftone dot shape preferentially grows into the corners of the two-dimensional halftone dot cell 200.

As shown in FIG. 18, the raster scanlines 520, 522, 524, 526, 528, 530 and 532 extend at an angle Θ through the two-dimensional halftone dot cell 200. The size of the halftone dot cell 200 and the angle Θ, as well as the positions of the scanlines 520–532 relative to the halftone dot cell 200, are determined by the screen frequency and angle data stored in the screen frequency and angle portion 333.

As shown in FIG. 15, the binary clustered irrational halftone dot generating system 300 is, in various exemplary embodiments, implemented using a programmed general purpose computer. However, the binary clustered irrational halftone dot generating system 300 can also be implemented on a special purpose computer, an ASIC or other integrated circuit, a digital signal processor, a hardwired electronic or logic circuit, such as a discrete element circuit, a programmable logic device, such as a PLD, PLA, FPGA, or PAL, or the like. In general, any device, capable of implementing a finite state machine that is in turn capable of implementing the flowcharts shown in FIGS. 4, 5A and 5B, can be used to implement the binary clustered irrational halftone dot generating system 300.

Moreover, it should be appreciated that the binary clustered irrational halftone dot generating system 300 can be implemented as software executing on a programmed general purpose computer, a special purpose computer, a microprocessor or the like. In this case, the binary clustered irrational halftone dot generating system 300 can be implemented as one or more routines or software elements or objects embedded in a printer driver, as a set of resources residing on a server, or the like. The binary clustered irrational halftone dot generating system 300 can also be implemented by physically incorporating it into a software and/or hardware system such as a hardware and software systems of a printer or digital photocopier.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for generating a clustered halftone dot for a binary image from grayscale data, comprising:

determining a grayscale image value to be represented by the binary clustered halftone dot;

determining a nominal halftone dot shape within a halftone cell based on the determined grayscale image value;

repeatedly positioning a sample window over the halftone cell, each position of the sample window enclosing a portion of the halftone cell;

for each position of the sample window:
  determining if an edge of the nominal halftone dot shape crosses edges of the sample window;
  determining which edges of the sample window are crossed by the edge of the nominal halftone dot shape;
  altering, if the edge of the nominal halftone dot shape crosses at least one predetermined edge of the sample window, the sample window until the edge of the nominal halftone dot does not cross any of the at least one predetermined edge of the altered sample window;
  determining an area amount of the nominal halftone dot shape enclosed by the altered sample window;
  determining a halftone amount portion of the altered sample window having an area corresponding to the determined area amount;
  determining if the halftone amount portion of the altered sample window overlaps any of the sample window; and
  generating a portion of the clustered halftone dot based on the portion of the halftone amount portion that overlaps the sample window.

2. The method of claim 1, wherein determining if an edge of the nominal halftone dot shape crosses edges of the sample window comprises:

determining, for each of a number of corner locations of the sample window, an image value of that corner location; and comparing the image values of the corner locations.

3. The method of claim 2, wherein, when the image values of all of the corner locations are a same image value, determining if an edge of the nominal halftone dot shape crosses edges of the sample window comprises determining that the edge of the nominal halftone dot shape does not cross any edge of the sample window.

4. The method of claim 1, wherein, when the image value of only one of the corner locations differs from the image value of the remaining corner locations, determining which edges of the sample window are crossed by the edge of the nominal halftone dot shape comprises determining that the edge of the nominal halftone dot shape crosses at least one of the predetermined edges of the sample window.

5. The method of claim 1, wherein, when the image values of two of the corner locations differ from the image value of the remaining corner locations, determining which edges of the sample window are crossed by the edge of the nominal halftone dot shape comprises:

determining, for each pair of corner locations adjacent to one of the predetermined edges of the sample window, if the images values of those corner locations are different; and if the images values of those corner locations are different, determining that the edge of the nominal halftone dot shape crosses that predetermined edge of the sample window.

6. The method of claim 1, wherein altering the sample window comprises:

determining, for each predetermined edge of the sample window, if the edge of the nominal halftone dot shape crosses that predetermined edge;

moving, for each predetermined edge that is crossed by the edge of the nominal halftone dot, that predetermined edge away from an interior of the sample window; and moving, for each predetermined edge that is not crossed by the edge of the nominal halftone dot, that predetermined edge into the interior of the sample window.

7. The method of claim 6, wherein moving, for each predetermined edge that is crossed by the edge of the nominal halftone dot, that predetermined edge away from an interior of the sample window comprises, for each such predetermined edge:

moving that predetermined edge away from the interior of the sample window by one subcell of the halftone cell;

determining if the edge of the nominal halftone dot shape continues to cross that predetermined edge; and repeating the moving and determining steps until the edge of the nominal halftone dot shape no longer crosses that predetermined edge.

8. The method of claim 6, wherein moving, for each predetermined edge that is crossed by the edge of the nominal halftone dot, that predetermined edge into the interior of the sample window comprises, for each such predetermined edge:

moving that predetermined edge into the interior of the sample window by one subcell of the halftone cell;

determining if the edge of the nominal halftone dot shape now crosses that predetermined edge;

repeating the moving and determining steps until the edge of the nominal halftone dot shape crosses that predetermined edge; and moving that predetermined edge back to the previous position of that predetermined edge once the edge of the nominal halftone dot shape crosses that predetermined edge.

9. The method of claim 1, wherein determining a halftone amount portion of the altered sample window having an area corresponding to the determined area amount comprises:

determining if any of the predetermined edges of the altered sample window lie within the bounds of the nominal halftone dot shape;

positioning, if one of the predetermined edges of the altered sample window lies within the bounds of the nominal halftone dot shape, the halftone amount portion adjacent to that predetermined edge; and positioning, if none of the predetermined edges of the altered sample window lies within the bounds of the nominal halftone dot shape, the halftone amount portion relative to a center of the altered sample window.

10. The method of claim 9, wherein the center of the altered sample window is one of a center of mass of the portion of the nominal halftone dot shape enclosed by the altered sample window, a center of a predetermined characteristic of the portion of the nominal halftone dot shape enclosed by the altered sample window, and a geometrical center of the altered sample window.

11. A method for generating a clustered halftone dot for a binary image from grayscale data, comprising:

determining a grayscale image value to be represented by the binary clustered halftone dot;

determining a nominal halftone dot shape within a halftone cell based on the determined grayscale image value;

positioning a sample window over the halftone cell, a portion of the halftone dot shape located within the sample window;

adjusting bounds of the sample window such that the adjusted sample window spans at least one edge of the halftone dot shape;

determining an amount represented by the portion of the halftone dot shape located within the adjusted sample window;

filling the adjusted window, from one of a left edge of the adjusted window, a right edge of the adjusted sample window, both the left and right edges of the adjusted window, or a center of the adjusted sample window, based on the determined amount;

determining an amount of the filled portion of the adjusted window that extends into the sample window; and storing the amount of the filled portion that extends into the sample window.

12. The method of claim 11, wherein adjusting the bounds of the sample window such that the adjusted sample window spans at least one edge of the halftone dot shape comprises:

determining if an edge of the nominal halftone dot shape crosses edges of the sample window;

determining which edges of the sample window are crossed by the edge of the nominal halftone dot shape; and adjusting, if the edge of the nominal halftone dot shape crosses at least one predetermined edge of the sample window, the sample window until the edge of the nominal halftone dot does not cross any of the at least one predetermined edge of the adjusted sample window.

13. The method of claim 12, wherein determining if an edge of the nominal halftone dot shape crosses edges of the sample window comprises:

determining, for each of a number of corner locations of the sample window, an image value of that corner location; and comparing the image values of the corner locations.

14. The method of claim 13, wherein, when the image values of all of the corner locations are a same image value, determining if an edge of the nominal halftone dot shape crosses edges of the sample window comprises determining that the edge of the nominal halftone dot shape does not cross any edge of the sample window.

15. The method of claim 13, wherein, when the image value of only one of the corner locations differs from the image value of the remaining corner locations, determining which edges of the sample window are crossed by the edge of the nominal halftone dot shape comprises determining that the edge of the nominal halftone dot shape crosses at least one of the predetermined edges of the sample window.

16. The method of claim 13, wherein, when the image values of two of the corner locations differ from the image value of the remaining corner locations, determining which edges of the sample window are crossed by the edge of the nominal halftone dot shape comprises:

determining, for each pair of corner locations adjacent to one of the predetermined edges of the sample window, if the images values of those corner locations are different; and if the images values of those corner locations are different, determining that the edge of the nominal halftone dot shape crosses that predetermined edge of the sample window.

17. The method of claim 12, wherein adjusting the sample window comprises:

determining, for each predetermined edge of the sample window, if the edge of the nominal halftone dot shape crosses that predetermined edge;

moving, for each predetermined edge that is crossed by the edge of the nominal halftone dot, that predetermined edge away from an interior of the sample window; and moving, for each predetermined edge that is not crossed by the edge of the nominal halftone dot, that predetermined edge into the interior of the sample window.

18. The method of claim 17, wherein moving, for each predetermined edge that is crossed by the edge of the nominal halftone dot, that predetermined edge away from an interior of the sample window comprises, for each such predetermined edge:

moving that predetermined edge away from the interior of the sample window by one subcell of the halftone cell;

determining if the edge of the nominal halftone dot shape continues to cross that predetermined edge; and repeating the moving and determining steps until the edge of the nominal halftone dot shape no longer crosses that predetermined edge.

19. The method of claim 17, wherein moving, for each predetermined edge that is crossed by the edge of the nominal halftone dot, that predetermined edge into the interior of the sample window comprises, for each such predetermined edge:

moving that predetermined edge into the interior of the sample window by one subcell of the halftone cell;

determining if the edge of the nominal halftone dot shape now crosses that predetermined edge;

repeating the moving and determining steps until the edge of the nominal halftone dot shape crosses that predetermined edge; and moving that predetermined edge back to the previous position of that predetermined edge once the edge of the nominal halftone dot shape crosses that predetermined edge.

20. The method of claim 11, wherein filling the adjusted window, from one of a left edge of the adjusted window, a right edge of the adjusted window, both the left and right edges of the adjusted window, or a center of the adjusted sample window, based on the determined amount comprises:

determining if any of the predetermined edges of the adjusted sample window lie within the bounds of the halftone dot shape;

positioning, if one of the predetermined edges of the adjusted sample window lies within the bounds of the halftone dot shape, the halftone amount portion adjacent to that predetermined edge;

positioning, if two of the predetermined edges of the adjusted sample window lie within the bounds of the halftone dot shape, some of the halftone amount portion adjacent to each of the two predetermined edges; and positioning, if none of the predetermined edges of the adjusted sample window lies within the bounds of the halftone dot shape, the halftone amount portion relative to a center of the adjusted sample window.

21. The method of claim 20, wherein the center of the adjusted sample window is one of a center of mass of the portion of the halftone dot shape located within the adjusted sample window, a center of a predetermined characteristic of the portion of the halftone dot shape located within the adjusted sample window, and a geometrical center of the adjusted sample window.

22. The method of claim 11, wherein the center of the adjusted sample window is one of a center of mass of the portion of the halftone dot shape located within the adjusted sample window, a center of a predetermined characteristic of the portion of the halftone dot shape located within the adjusted sample window, and a geometrical center of the adjusted sample window.

23. The method of claim 11, wherein determining the amount represented by the portion of the halftone dot shape located within the adjusted sample window comprises:

determining an area amount of the halftone dot shape located within the adjusted sample window; and determining a halftone amount portion of the adjusted sample window having an area corresponding to the determined area amount.

24. The method of claim 11, wherein determining the amount of the filled portion of the adjusted sample window that extends into the sample window comprises determining if the halftone amount portion of the adjusted sample window overlaps any of the sample window.

25. The method of claim 11, further comprising:

repeatedly positioning the sample window over the halftone cell, each position of the sample window enclosing a portion of the halftone cell; and repeating the adjusting step, the first amount determining step, the filling step, the second amount determining step and the storing step for each position of the sample window.

26. The method of claim 11, further comprising generating a portion of the clustered halftone dot based on the amount of the filled portion of the adjusted window that extends into the sample window.

* * * * *